US009100457B2

(12) United States Patent
Hsu

(10) Patent No.: US 9,100,457 B2
(45) Date of Patent: Aug. 4, 2015

(54) METHOD AND APPARATUS FOR TRANSMISSION FRAMING IN A WIRELESS COMMUNICATION SYSTEM

(75) Inventor: Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2741 days.

(21) Appl. No.: 09/933,639

(22) Filed: Aug. 20, 2001

(65) Prior Publication Data

US 2002/0141371 A1 Oct. 3, 2002

Related U.S. Application Data

(60) Provisional application No. 60/279,970, filed on Mar. 28, 2001.

(51) Int. Cl.
*H04L 12/54* (2006.01)
*H04L 29/06* (2006.01)
(Continued)

(52) U.S. Cl.
CPC .......... *H04L 65/4076* (2013.01); *H04L 1/0083* (2013.01); *H04L 12/1877* (2013.01); *H04L 29/06* (2013.01); *H04L 29/06027* (2013.01); *H04L 63/0442* (2013.01); *H04L 63/068* (2013.01); *H04L 63/164* (2013.01); *H04L 65/607* (2013.01); *H04L 65/608* (2013.01); *H04L 69/161* (2013.01); *H04L 69/164* (2013.01); *H04L 69/324* (2013.01); *H04W 28/06* (2013.01); *H04W 28/18* (2013.01); *H03M 13/09* (2013.01); *H04L 12/189* (2013.01); *H04L 63/061* (2013.01); *H04L 69/16* (2013.01); *H04L 2209/80* (2013.01); *H04L 2463/101* (2013.01);

(Continued)

(58) Field of Classification Search
USPC ......... 370/328, 338, 389, 392, 400, 401, 466, 370/469, 474, 505; 709/236
See application file for complete search history.

(56) References Cited

U.S. PATENT DOCUMENTS

| | | | |
|---|---|---|---|
| 4,163,255 A | 7/1979 | Pires | |
| 4,323,921 A | 4/1982 | Guillou | |

(Continued)

FOREIGN PATENT DOCUMENTS

| | | | |
|---|---|---|---|
| CA | 2308405 A1 | 11/2000 | |
| CN | 1240317 A | 1/2000 | |

(Continued)

OTHER PUBLICATIONS

Carsten Bormann: "Robust Header Compression (ROHC): Framework and four profiles: RTP, UDP, ESP, and uncompressed <draft-ietf-rohc-rtp-09.txt>," Internet Engineering Task Force IETF Draft; URL:http://www._globecom.net/jetf/draft/draft-ietf-rohc-rtp-09. html. Retrieved Mar. 22, 2003. Feb. 26, 2001, pp. 1-145.

(Continued)

*Primary Examiner* — Hassan Phillips
*Assistant Examiner* — Duc Duong
(74) *Attorney, Agent, or Firm* — Howard Seo

(57) ABSTRACT

Method and apparatus for framing in a wireless transmission system supporting broadcast transmissions. A framing format incorporates fields specific to a uni-directional transmission and reduces the overhead of the system. One embodiment employs a version of HDLC having a start of frame field and an error checking mechanism attached to the payload of each frame, wherein protocol information is not transmitted with each individual frame.

22 Claims, 13 Drawing Sheets

(51) Int. Cl.
   *H04L 1/00*     (2006.01)
   *H04L 12/18*    (2006.01)
   *H04W 28/06*    (2009.01)
   *H04W 28/18*    (2009.01)
   *H04L 29/08*    (2006.01)
   *H03M 13/09*    (2006.01)
   *H04W 4/00*     (2009.01)
   *H04W 28/04*    (2009.01)
   *H04W 80/00*    (2009.01)
   *H04W 52/02*    (2009.01)

(52) U.S. Cl.
   CPC ............. *H04W4/00* (2013.01); *H04W 28/04* (2013.01); *H04W 52/0216* (2013.01); *H04W 80/00* (2013.01)

(56) References Cited

U.S. PATENT DOCUMENTS

| | | |
|---|---|---|
| 4,336,612 A | 6/1982 | Inoue et al. |
| 4,750,167 A | 6/1988 | Meyer |
| 4,870,408 A | 9/1989 | Zdunek et al. |
| 4,881,263 A | 11/1989 | Herbison et al. |
| 4,901,307 A | 2/1990 | Gilhousen et al. |
| RE33,189 E | 3/1990 | Lee et al. |
| 4,924,513 A | 5/1990 | Herbison et al. |
| 5,052,000 A | 9/1991 | Wang et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,117,457 A | 5/1992 | Comerford et al. |
| 5,136,586 A | 8/1992 | Greenblatt |
| 5,150,412 A | 9/1992 | Maru |
| 5,159,447 A | 10/1992 | Haskell et al. |
| 5,164,988 A | 11/1992 | Matyas et al. |
| 5,235,631 A | 8/1993 | Grube et al. |
| 5,237,612 A | 8/1993 | Raith |
| 5,239,584 A | 8/1993 | Hershey et al. |
| 5,241,598 A | 8/1993 | Raith |
| 5,253,294 A | 10/1993 | Maurer |
| 5,257,396 A | 10/1993 | Auld, Jr. et al. |
| 5,325,357 A | 6/1994 | Kimoto et al. |
| 5,351,087 A | 9/1994 | Christopher et al. |
| 5,353,332 A | 10/1994 | Raith et al. |
| 5,363,379 A | 11/1994 | Eckenrode et al. |
| 5,365,572 A | 11/1994 | Saegusa et al. |
| 5,369,784 A | 11/1994 | Nelson |
| 5,371,794 A | 12/1994 | Diffie et al. |
| 5,404,563 A | 4/1995 | Green et al. |
| 5,410,602 A | 4/1995 | Finkelstein et al. |
| 5,412,655 A | 5/1995 | Yamada et al. |
| 5,421,006 A | 5/1995 | Jablon et al. |
| 5,442,626 A | 8/1995 | Wei |
| 5,448,568 A | 9/1995 | Delpuch et al. |
| 5,467,398 A | 11/1995 | Pierce et al. |
| 5,473,609 A | 12/1995 | Chaney |
| 5,473,642 A | 12/1995 | Osawa |
| 5,481,613 A | 1/1996 | Ford et al. |
| 5,485,577 A | 1/1996 | Eyer et al. |
| 5,504,773 A | 4/1996 | Padovani et al. |
| 5,513,245 A | 4/1996 | Mizikovsky et al. |
| 5,515,441 A | 5/1996 | Faucher |
| 5,537,474 A | 7/1996 | Brown et al. |
| 5,565,909 A | 10/1996 | Thibadeau et al. |
| 5,579,393 A | 11/1996 | Conner et al. |
| 5,592,470 A | 1/1997 | Rudrapatna et al. |
| 5,659,556 A | 8/1997 | Denissen et al. |
| 5,673,259 A | 9/1997 | Quick, Jr. |
| 5,686,963 A | 11/1997 | Uz et al. |
| 5,708,961 A | 1/1998 | Hylton et al. |
| 5,729,540 A | 3/1998 | Wegrzyn |
| 5,748,736 A | 5/1998 | Mittra |
| 5,751,707 A | 5/1998 | Voit et al. |
| 5,751,725 A | 5/1998 | Chen |
| 5,758,068 A | 5/1998 | Brandt et al. |
| 5,758,291 A | 5/1998 | Grube et al. |
| 5,768,276 A | 6/1998 | Diachina et al. |
| 5,774,496 A | 6/1998 | Butler et al. |
| 5,778,059 A | 7/1998 | Loghmani et al. |
| 5,778,069 A | 7/1998 | Thomlinson et al. |
| 5,778,187 A | 7/1998 | Monteiro et al. |
| 5,787,172 A | 7/1998 | Arnold |
| 5,787,347 A | 7/1998 | Yu et al. |
| 5,796,829 A | 8/1998 | Newby et al. |
| 5,835,730 A | 11/1998 | Grossman et al. |
| 5,850,444 A | 12/1998 | Rune |
| 5,850,445 A | 12/1998 | Chan et al. |
| 5,870,474 A | 2/1999 | Wasilewski et al. |
| 5,878,141 A | 3/1999 | Daly et al. |
| 5,881,368 A | 3/1999 | Grob et al. |
| 5,884,196 A | 3/1999 | Lekven et al. |
| 5,887,252 A | 3/1999 | Noneman |
| 5,909,491 A | 6/1999 | Luo |
| 5,915,024 A | 6/1999 | Kitaori et al. |
| 5,923,649 A | 7/1999 | Raith |
| 5,936,965 A | 8/1999 | Doshi et al. |
| 5,940,507 A | 8/1999 | Cane et al. |
| 5,946,316 A | 8/1999 | Chen et al. |
| 5,956,404 A | 9/1999 | Schneier et al. |
| 5,956,681 A * | 9/1999 | Yamakita ................ 704/260 |
| 5,970,072 A | 10/1999 | Gammenthaler, Jr. et al. |
| 5,970,417 A | 10/1999 | Toyryla et al. |
| 5,978,386 A | 11/1999 | Haemaelaeinen et al. |
| 5,983,099 A | 11/1999 | Yao et al. |
| 5,983,388 A | 11/1999 | Friedman et al. |
| 5,990,928 A | 11/1999 | Sklar et al. |
| 5,991,400 A | 11/1999 | Kamperman |
| 5,991,407 A | 11/1999 | Murto |
| 6,006,073 A | 12/1999 | Glauner et al. |
| 6,014,765 A | 1/2000 | Maeda et al. |
| 6,018,360 A | 1/2000 | Stewart et al. |
| 6,021,124 A | 2/2000 | Haartsen |
| 6,026,165 A | 2/2000 | Marino et al. |
| 6,032,197 A * | 2/2000 | Birdwell et al. ............ 709/247 |
| 6,044,154 A | 3/2000 | Kelly |
| 6,047,071 A | 4/2000 | Shah |
| 6,047,395 A | 4/2000 | Zook |
| 6,052,812 A | 4/2000 | Chen et al. |
| 6,055,236 A | 4/2000 | Nessett et al. |
| 6,055,314 A | 4/2000 | Spies et al. |
| 6,058,289 A | 5/2000 | Gardner et al. |
| 6,065,061 A | 5/2000 | Blahut et al. |
| 6,067,290 A | 5/2000 | Paulraj et al. |
| 6,073,122 A | 6/2000 | Wool |
| 6,081,907 A | 6/2000 | Witty et al. |
| 6,097,817 A | 8/2000 | Bilgic et al. |
| 6,098,878 A | 8/2000 | Dent et al. |
| 6,108,424 A | 8/2000 | Pitiot |
| 6,108,706 A | 8/2000 | Birdwell et al. |
| 6,111,866 A | 8/2000 | Kweon et al. |
| 6,122,763 A | 9/2000 | Pyndiah et al. |
| 6,128,389 A | 10/2000 | Chan et al. |
| 6,128,490 A | 10/2000 | Shaheen et al. |
| 6,128,735 A | 10/2000 | Goldstein et al. |
| 6,148,010 A | 11/2000 | Sutton et al. |
| 6,148,400 A | 11/2000 | Arnold |
| 6,157,719 A | 12/2000 | Wasilewski et al. |
| 6,172,972 B1 * | 1/2001 | Birdwell et al. ............ 370/349 |
| 6,185,430 B1 | 2/2001 | Yee et al. |
| 6,195,546 B1 | 2/2001 | Leung et al. |
| 6,199,161 B1 | 3/2001 | Ahvenainen |
| 6,201,961 B1 | 3/2001 | Schindall et al. |
| 6,208,634 B1 | 3/2001 | Boulos et al. |
| 6,230,024 B1 | 5/2001 | Wang et al. |
| 6,233,234 B1 | 5/2001 | Curry et al. |
| 6,233,341 B1 | 5/2001 | Riggins |
| 6,240,091 B1 | 5/2001 | Ginzboorg et al. |
| 6,253,069 B1 | 6/2001 | Mankovitz |
| 6,253,326 B1 | 6/2001 | Lincke et al. |
| 6,256,509 B1 | 7/2001 | Tanaka et al. |
| 6,266,420 B1 | 7/2001 | Langford et al. |
| 6,272,632 B1 | 8/2001 | Carman et al. |
| 6,295,361 B1 | 9/2001 | Kadansky et al. |

(56) References Cited

U.S. PATENT DOCUMENTS

| | | |
|---|---|---|
| 6,310,661 B1 | 10/2001 | Arsenault |
| 6,314,095 B1 | 11/2001 | Loa |
| 6,343,280 B2 | 1/2002 | Clark |
| 6,345,307 B1 | 2/2002 | Booth |
| 6,353,614 B1 | 3/2002 | Borella et al. |
| 6,363,242 B1 | 3/2002 | Brown, Jr. et al. |
| 6,363,480 B1 | 3/2002 | Perlman |
| 6,366,776 B1 | 4/2002 | Wright et al. |
| 6,373,829 B1 | 4/2002 | Vilmur |
| 6,374,103 B1 | 4/2002 | Kamel et al. |
| 6,377,810 B1 | 4/2002 | Geiger et al. |
| 6,385,200 B1 | 5/2002 | Erami et al. |
| 6,385,461 B1 | 5/2002 | Raith |
| 6,408,001 B1 * | 6/2002 | Chuah et al. .................. 370/392 |
| 6,415,312 B1 | 7/2002 | Boivie |
| 6,424,717 B1 | 7/2002 | Pinder et al. |
| 6,424,947 B1 | 7/2002 | Tsuria et al. |
| 6,434,367 B1 | 8/2002 | Kumar et al. |
| 6,449,491 B1 | 9/2002 | Dailey |
| 6,456,716 B1 | 9/2002 | Arnold |
| 6,460,156 B1 | 10/2002 | Laukkanen et al. |
| 6,463,155 B1 | 10/2002 | Akiyama et al. |
| 6,473,419 B1 | 10/2002 | Gray et al. |
| 6,473,858 B1 | 10/2002 | Shimomura et al. |
| 6,477,377 B2 | 11/2002 | Backstrom et al. |
| 6,490,259 B1 | 12/2002 | Agrawal et al. |
| 6,493,761 B1 * | 12/2002 | Baker et al. .................. 709/230 |
| 6,502,140 B1 | 12/2002 | Boivie |
| 6,507,590 B1 * | 1/2003 | Terho et al. .................. 370/466 |
| 6,510,515 B1 | 1/2003 | Raith |
| RE38,007 E | 2/2003 | Tsukamoto et al. |
| 6,519,266 B1 | 2/2003 | Manning et al. |
| 6,523,069 B1 | 2/2003 | Luczycki et al. |
| 6,529,740 B1 | 3/2003 | Ganucheau, Jr. et al. |
| 6,536,041 B1 | 3/2003 | Knudson et al. |
| 6,538,996 B1 | 3/2003 | West et al. |
| 6,539,242 B1 | 3/2003 | Bayley |
| 6,542,490 B1 * | 4/2003 | Ahmadvand et al. ......... 370/338 |
| 6,542,504 B1 * | 4/2003 | Mahler et al. ................. 370/392 |
| 6,549,771 B2 | 4/2003 | Chang et al. |
| 6,560,206 B1 | 5/2003 | Naden et al. |
| 6,564,211 B1 | 5/2003 | Andreev et al. |
| 6,567,914 B1 | 5/2003 | Just et al. |
| 6,571,109 B1 | 5/2003 | Kim |
| 6,574,211 B2 | 6/2003 | Padovani et al. |
| 6,577,734 B1 | 6/2003 | Etzel et al. |
| 6,577,848 B1 | 6/2003 | Gregg et al. |
| 6,580,756 B1 | 6/2003 | Matsui et al. |
| 6,598,203 B1 | 7/2003 | Tang |
| 6,600,745 B1 | 7/2003 | Chopping |
| 6,601,068 B1 | 7/2003 | Park |
| 6,603,857 B1 | 8/2003 | Batten-Carew et al. |
| 6,606,706 B1 | 8/2003 | Li |
| 6,608,841 B1 | 8/2003 | Koodli |
| 6,614,804 B1 | 9/2003 | McFadden et al. |
| 6,633,979 B1 | 10/2003 | Smeets |
| 6,640,094 B1 | 10/2003 | Tabeta |
| 6,647,000 B1 | 11/2003 | Persson et al. |
| 6,654,384 B1 | 11/2003 | Reza et al. |
| 6,658,463 B1 | 12/2003 | Dillon et al. |
| 6,658,605 B1 | 12/2003 | Yoshida et al. |
| 6,665,718 B1 | 12/2003 | Chuah et al. |
| 6,678,856 B1 | 1/2004 | Jordan et al. |
| 6,680,920 B1 | 1/2004 | Wan |
| 6,690,795 B1 | 2/2004 | Richards |
| 6,704,368 B1 | 3/2004 | Nefedov |
| 6,704,369 B1 | 3/2004 | Kawasaki et al. |
| 6,707,801 B2 | 3/2004 | Hsu |
| 6,711,182 B1 | 3/2004 | Gibbs et al. |
| 6,714,650 B1 | 3/2004 | Maillard et al. |
| 6,721,805 B1 * | 4/2004 | Bhagwat et al. ............... 709/250 |
| 6,728,226 B1 | 4/2004 | Naito |
| 6,731,936 B2 | 5/2004 | Chen et al. |
| 6,735,177 B1 | 5/2004 | Suzuki |
| 6,735,190 B1 * | 5/2004 | Chuah et al. .................. 370/352 |
| 6,738,942 B1 | 5/2004 | Sridharan et al. |
| 6,751,218 B1 | 6/2004 | Hagirahim et al. |
| 6,760,602 B2 | 7/2004 | Tangorra et al. |
| 6,760,752 B1 | 7/2004 | Liu et al. |
| 6,763,025 B2 * | 7/2004 | Leatherbury et al. .... 370/395.64 |
| 6,765,909 B1 | 7/2004 | Sen et al. |
| 6,766,024 B1 | 7/2004 | Rix |
| 6,775,303 B1 | 8/2004 | Rustad et al. |
| 6,781,999 B2 | 8/2004 | Eyuboglu et al. |
| 6,788,681 B1 | 9/2004 | Hurren et al. |
| 6,792,048 B1 | 9/2004 | Lee et al. |
| 6,798,791 B1 | 9/2004 | Riazi et al. |
| 6,801,508 B1 | 10/2004 | Lim |
| 6,804,520 B1 | 10/2004 | Johansson et al. |
| 6,810,499 B2 | 10/2004 | Sridharan et al. |
| 6,819,930 B1 | 11/2004 | Laroia et al. |
| 6,826,406 B1 | 11/2004 | Vialen et al. |
| 6,829,741 B1 | 12/2004 | Khansari et al. |
| 6,831,910 B1 | 12/2004 | Moon et al. |
| 6,832,314 B1 | 12/2004 | Irvin |
| 6,856,800 B1 | 2/2005 | Henry et al. |
| 6,862,684 B1 | 3/2005 | DiGiorgio |
| 6,870,923 B2 | 3/2005 | Yi |
| 6,879,573 B1 | 4/2005 | Huo |
| 6,879,690 B2 | 4/2005 | Faccin et al. |
| 6,882,850 B2 | 4/2005 | McConnell et al. |
| 6,882,860 B1 | 4/2005 | Kim |
| 6,885,874 B2 | 4/2005 | Grube et al. |
| 6,888,899 B2 | 5/2005 | Raleigh et al. |
| 6,895,216 B2 | 5/2005 | Sato et al. |
| 6,895,546 B2 | 5/2005 | Ivry |
| 6,898,285 B1 | 5/2005 | Hutchings et al. |
| 6,898,640 B1 | 5/2005 | Kurita |
| 6,909,702 B2 | 6/2005 | Leung et al. |
| 6,915,272 B1 | 7/2005 | Zilliacus et al. |
| 6,918,035 B1 | 7/2005 | Patel |
| 6,920,119 B2 | 7/2005 | Rinchiuso |
| 6,925,285 B2 | 8/2005 | Kim |
| 6,952,454 B1 | 10/2005 | Jalali et al. |
| 6,956,833 B1 | 10/2005 | Yukie et al. |
| 6,959,384 B1 | 10/2005 | Serret-Avila |
| 6,963,544 B1 | 11/2005 | Balachandran et al. |
| 6,978,143 B1 | 12/2005 | Vialen |
| 6,983,410 B2 | 1/2006 | Chen et al. |
| 6,987,982 B2 | 1/2006 | Willenegger et al. |
| 6,990,680 B1 | 1/2006 | Wugofski |
| 7,016,351 B1 | 3/2006 | Farinacci et al. |
| 7,024,616 B2 | 4/2006 | Ohira et al. |
| 7,031,666 B2 | 4/2006 | Hsu |
| 7,039,180 B1 | 5/2006 | Issaa et al. |
| 7,069,436 B1 | 6/2006 | Akachi |
| 7,079,502 B2 | 7/2006 | Yamano et al. |
| 7,079,523 B2 | 7/2006 | Nelson, Jr. et al. |
| 7,096,355 B1 | 8/2006 | Marvit et al. |
| 7,114,175 B2 | 9/2006 | Lahteenmaki |
| 7,116,892 B2 | 10/2006 | Wajs |
| 7,133,353 B2 | 11/2006 | Sourour et al. |
| 7,134,019 B2 | 11/2006 | Shelest et al. |
| 7,181,620 B1 | 2/2007 | Hur |
| 7,184,789 B2 | 2/2007 | Leung et al. |
| 7,185,362 B2 | 2/2007 | Hawkes et al. |
| 7,197,072 B1 | 3/2007 | Hsu et al. |
| 7,203,314 B1 | 4/2007 | Kahn et al. |
| 7,209,459 B2 | 4/2007 | Kangas |
| 7,215,775 B2 | 5/2007 | Noguchi et al. |
| 7,219,291 B2 | 5/2007 | Adde et al. |
| 7,228,358 B1 * | 6/2007 | McManus ..................... 709/239 |
| 7,237,108 B2 | 6/2007 | Medvinsky et al. |
| 7,239,704 B1 | 7/2007 | Maillard et al. |
| 7,266,687 B2 | 9/2007 | Sowa et al. |
| 7,301,946 B2 | 11/2007 | Meier et al. |
| 7,301,968 B2 | 11/2007 | Haran et al. |
| 7,308,100 B2 | 12/2007 | Bender et al. |
| 7,321,968 B1 | 1/2008 | Capellaro et al. |
| 7,349,425 B2 | 3/2008 | Leung et al. |
| 7,352,868 B2 | 4/2008 | Hawkes et al. |
| 7,376,963 B2 | 5/2008 | Kato et al. |
| 7,391,866 B2 | 6/2008 | Fukami et al. |
| 7,428,512 B2 | 9/2008 | Nozaki et al. |

(56) References Cited

U.S. PATENT DOCUMENTS

| | | | |
|---|---|---|---|
| 7,599,655 | B2 | 10/2009 | Agashe et al. |
| 7,649,829 | B2 | 1/2010 | Chen et al. |
| 7,669,104 | B2 | 2/2010 | Uchida et al. |
| 7,693,508 | B2 | 4/2010 | Leung et al. |
| 7,697,523 | B2 | 4/2010 | Leung et al. |
| 7,742,781 | B2 | 6/2010 | Chen et al. |
| 7,792,074 | B2 | 9/2010 | Chen et al. |
| 7,944,925 | B2 | 5/2011 | Meier et al. |
| 8,077,679 | B2 | 12/2011 | Leung |
| 8,098,818 | B2 | 1/2012 | Grilli et al. |
| 8,121,296 | B2 | 2/2012 | Hawkes et al. |
| 8,730,999 | B2 | 5/2014 | Chen et al. |
| 2001/0004761 | A1 | 6/2001 | Zehavi |
| 2001/0029581 | A1 | 10/2001 | Knauft |
| 2001/0034254 | A1 | 10/2001 | Ranta |
| 2001/0036200 | A1 | 11/2001 | Nelson et al. |
| 2001/0036834 | A1 | 11/2001 | Das et al. |
| 2001/0055298 | A1 | 12/2001 | Baker et al. |
| 2002/0001386 | A1 | 1/2002 | Akiyama |
| 2002/0002541 | A1 | 1/2002 | Williams |
| 2002/0002674 | A1 | 1/2002 | Grimes et al. |
| 2002/0014159 | A1 | 2/2002 | Tatsumi et al. |
| 2002/0021809 | A1 | 2/2002 | Salo et al. |
| 2002/0023165 | A1 | 2/2002 | Lahr |
| 2002/0026525 | A1* | 2/2002 | Armitage .................... 709/238 |
| 2002/0071558 | A1 | 6/2002 | Patel |
| 2002/0076195 | A1 | 6/2002 | Nakajima et al. |
| 2002/0080887 | A1 | 6/2002 | Jeong et al. |
| 2002/0091860 | A1 | 7/2002 | Kalliokulju et al. |
| 2002/0091931 | A1 | 7/2002 | Quick et al. |
| 2002/0097722 | A1 | 7/2002 | Liao et al. |
| 2002/0099949 | A1 | 7/2002 | Fries et al. |
| 2002/0102964 | A1 | 8/2002 | Park |
| 2002/0112234 | A1 | 8/2002 | Bacon |
| 2002/0114469 | A1 | 8/2002 | Faccin et al. |
| 2002/0141591 | A1 | 10/2002 | Hawkes et al. |
| 2002/0164025 | A1 | 11/2002 | Raiz et al. |
| 2002/0169724 | A1 | 11/2002 | Moroney et al. |
| 2002/0181423 | A1 | 12/2002 | Chen et al. |
| 2003/0009669 | A1 | 1/2003 | White et al. |
| 2003/0014685 | A1 | 1/2003 | Chong, Jr. |
| 2003/0028805 | A1 | 2/2003 | Lahteenmaki |
| 2003/0030581 | A1 | 2/2003 | Roy |
| 2003/0031322 | A1 | 2/2003 | Beckmann et al. |
| 2003/0035389 | A1 | 2/2003 | Chen et al. |
| 2003/0039237 | A1 | 2/2003 | Forslow |
| 2003/0054807 | A1 | 3/2003 | Hsu et al. |
| 2003/0072384 | A1 | 4/2003 | Chen et al. |
| 2003/0087653 | A1 | 5/2003 | Leung et al. |
| 2003/0101401 | A1 | 5/2003 | Salvi et al. |
| 2003/0123669 | A1 | 7/2003 | Koukoulidis et al. |
| 2003/0126440 | A1 | 7/2003 | Go et al. |
| 2003/0134655 | A1 | 7/2003 | Chen et al. |
| 2003/0135748 | A1 | 7/2003 | Yamada et al. |
| 2003/0157952 | A1 | 8/2003 | Sarkkinen et al. |
| 2003/0217057 | A1 | 11/2003 | Kuroiwa et al. |
| 2004/0019787 | A1 | 1/2004 | Shibata |
| 2004/0022216 | A1 | 2/2004 | Shi |
| 2004/0095515 | A1 | 5/2004 | Tajima |
| 2004/0101138 | A1 | 5/2004 | Revital et al. |
| 2004/0107350 | A1 | 6/2004 | Wasilewski et al. |
| 2004/0120527 | A1 | 6/2004 | Hawkes et al. |
| 2004/0131185 | A1 | 7/2004 | Kakumer |
| 2004/0132402 | A1 | 7/2004 | Agashe et al. |
| 2004/0151317 | A1 | 8/2004 | Hyyppa et al. |
| 2004/0199474 | A1 | 10/2004 | Ritter |
| 2004/0202329 | A1 | 10/2004 | Jung et al. |
| 2004/0243808 | A1 | 12/2004 | Ishiguro et al. |
| 2004/0266391 | A1 | 12/2004 | Hafren |
| 2005/0008159 | A1 | 1/2005 | Grilli et al. |
| 2005/0010774 | A1 | 1/2005 | Rose et al. |
| 2005/0048963 | A1 | 3/2005 | Kubler et al. |
| 2005/0055551 | A1 | 3/2005 | Becker et al. |
| 2005/0063544 | A1 | 3/2005 | Uusitalo et al. |
| 2005/0108563 | A1 | 5/2005 | Becker et al. |
| 2005/0138379 | A1 | 6/2005 | Semple et al. |
| 2005/0144550 | A1 | 6/2005 | Jeon et al. |
| 2005/0165711 | A1 | 7/2005 | Hamatsu |
| 2005/0238315 | A1 | 10/2005 | Kataoka |
| 2005/0271210 | A1 | 12/2005 | Soppera |
| 2006/0078000 | A1 | 4/2006 | Rinne et al. |
| 2006/0168446 | A1 | 7/2006 | Ahonen |
| 2006/0171540 | A1 | 8/2006 | Lee et al. |
| 2006/0242412 | A1 | 10/2006 | Jung et al. |
| 2007/0038610 | A1 | 2/2007 | Omoigui |
| 2007/0116282 | A1 | 5/2007 | Hawkes et al. |
| 2007/0214482 | A1 | 9/2007 | Nguyen |
| 2007/0280169 | A1 | 12/2007 | Cam Winget |
| 2008/0226073 | A1 | 9/2008 | Hawkes et al. |
| 2010/0048206 | A1 | 2/2010 | Agashe et al. |
| 2010/0107041 | A1 | 4/2010 | Chen et al. |
| 2010/0142432 | A1 | 6/2010 | Leung et al. |
| 2010/0272124 | A1 | 10/2010 | Chen et al. |
| 2011/0045864 | A1 | 2/2011 | Chen et al. |
| 2012/0314650 | A1* | 12/2012 | Medapalli et al. ............ 370/328 |
| 2013/0022032 | A1* | 1/2013 | Taghavi Nasrabadi et al. ............................ 370/338 |

FOREIGN PATENT DOCUMENTS

| | | |
|---|---|---|
| CN | 1256599 A | 6/2000 |
| CN | 1281561 | 1/2001 |
| CN | 1299497 A | 6/2001 |
| EP | 0636963 | 1/1995 |
| EP | 0702477 A2 | 3/1996 |
| EP | 0717566 A1 | 6/1996 |
| EP | 0748058 A2 | 12/1996 |
| EP | 0813309 A2 | 12/1997 |
| EP | 0854618 A2 | 7/1998 |
| EP | 0924898 A1 | 6/1999 |
| EP | 0928084 A2 | 7/1999 |
| EP | 0951198 A2 | 10/1999 |
| EP | 0993128 A1 | 4/2000 |
| EP | 0999656 A1 | 5/2000 |
| EP | 1001570 A2 | 5/2000 |
| EP | 1075123 | 7/2000 |
| EP | 1024661 | 8/2000 |
| EP | 1030484 A2 | 8/2000 |
| EP | 1032150 A2 | 8/2000 |
| EP | 2346512 A | 8/2000 |
| EP | 1071296 | 1/2001 |
| EP | 1075118 | 2/2001 |
| EP | 1098446 A2 | 5/2001 |
| EP | 1117204 | 7/2001 |
| EP | 1143635 A1 | 10/2001 |
| EP | 1185125 A1 | 3/2002 |
| EP | 1190526 A1 | 3/2002 |
| EP | 1213943 | 6/2002 |
| EP | 1248188 | 10/2002 |
| EP | 1374477 A1 | 1/2004 |
| JP | 1101042 | 4/1989 |
| JP | 2090840 A | 3/1990 |
| JP | H0362630 A | 3/1991 |
| JP | 03179841 | 5/1991 |
| JP | 5216411 A | 8/1993 |
| JP | 06125554 | 5/1994 |
| JP | 7193569 | 7/1995 |
| JP | 09-135478 | 5/1997 |
| JP | 9331314 A | 12/1997 |
| JP | 10023529 A | 1/1998 |
| JP | 10051380 A | 2/1998 |
| JP | 10063598 A | 3/1998 |
| JP | 10-093547 | 4/1998 |
| JP | 10191459 | 7/1998 |
| JP | 10200536 A | 7/1998 |
| JP | H10210029 A | 8/1998 |
| JP | 10240826 | 11/1998 |
| JP | 10512428 | 11/1998 |
| JP | 11110401 A | 4/1999 |
| JP | 11127468 | 5/1999 |
| JP | 11136669 A | 5/1999 |
| JP | 11161167 | 6/1999 |
| JP | 11-243569 | 9/1999 |
| JP | 11510668 T | 9/1999 |

(56) References Cited

FOREIGN PATENT DOCUMENTS

| | | |
|---|---|---|
| JP | 11-331070 | 11/1999 |
| JP | 11-331150 | 11/1999 |
| JP | 11313059 A | 11/1999 |
| JP | 11513853 | 11/1999 |
| JP | 11-355958 | 12/1999 |
| JP | 11345179 A | 12/1999 |
| JP | 11355460 A | 12/1999 |
| JP | 2000040064 A | 2/2000 |
| JP | 2000-078555 | 3/2000 |
| JP | 2000115860 A | 4/2000 |
| JP | 2000137551 A | 5/2000 |
| JP | 2000138632 A | 5/2000 |
| JP | 2000165258 A | 6/2000 |
| JP | 2000183968 A | 6/2000 |
| JP | 2000-196673 | 7/2000 |
| JP | 2000196546 A | 7/2000 |
| JP | 2000224261 A | 8/2000 |
| JP | 2000224648 A | 8/2000 |
| JP | 2000-253459 | 9/2000 |
| JP | 2000244603 A | 9/2000 |
| JP | 2000253065 A | 9/2000 |
| JP | 2000261374 A | 9/2000 |
| JP | 2000269959 | 9/2000 |
| JP | 000513519 | 10/2000 |
| JP | 2000295541 | 10/2000 |
| JP | 2000324155 A | 11/2000 |
| JP | 2000349755 A | 12/2000 |
| JP | 2001007759 A | 1/2001 |
| JP | 2001016179 A | 1/2001 |
| JP | 2001018253 A | 1/2001 |
| JP | 2001500327 | 1/2001 |
| JP | 2001-053675 | 2/2001 |
| JP | 200136941 | 2/2001 |
| JP | 2001045100 A | 2/2001 |
| JP | 2001-077859 | 3/2001 |
| JP | 2001136507 A | 5/2001 |
| JP | 2001-177513 | 6/2001 |
| JP | 2001177523 A | 6/2001 |
| JP | 2001177564 A | 6/2001 |
| JP | 2001510970 | 8/2001 |
| JP | 2001268535 A | 9/2001 |
| JP | 2003259284 A | 9/2001 |
| JP | 2001333032 A | 11/2001 |
| JP | 2002502204 A | 1/2002 |
| JP | 2002064785 A | 2/2002 |
| JP | 2002505458 T | 2/2002 |
| JP | 2002514024 | 5/2002 |
| JP | 2002175505 | 6/2002 |
| JP | 2002521879 T | 7/2002 |
| JP | 2002216040 | 8/2002 |
| JP | 2002232418 A | 8/2002 |
| JP | 2002232962 | 8/2002 |
| JP | 2002524941 A | 8/2002 |
| JP | 2002300152 | 10/2002 |
| JP | 2002319936 | 10/2002 |
| JP | 2002353951 A | 12/2002 |
| JP | 2003503896 | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003297015 A | 10/2003 |
| JP | 2003339000 A | 11/2003 |
| JP | 2004048718 A | 2/2004 |
| JP | 200480663 | 3/2004 |
| JP | 2004507175 A | 3/2004 |
| JP | 2004533174 | 10/2004 |
| JP | 2004343764 | 12/2004 |
| JP | 2005509367 | 4/2005 |
| JP | 2005512471 | 4/2005 |
| JP | 2005507572 | 5/2005 |
| JP | 2006518975 A | 8/2006 |
| KR | 20000062153 | 10/2000 |
| KR | 200130725 | 4/2001 |
| KR | 20010030696 | 4/2001 |
| RU | 2073913 C1 | 2/1997 |
| RU | 2077113 | 4/1997 |
| RU | 2091983 | 9/1997 |
| RU | 2115249 | 7/1998 |
| RU | 2147792 | 4/2000 |
| RU | 2187205 C2 | 8/2002 |
| TW | 353841 | 3/1999 |
| TW | 373372 | 11/1999 |
| TW | 388158 | 4/2000 |
| TW | 448658 | 8/2001 |
| TW | 502190 | 9/2002 |
| WO | 8301881 A1 | 5/1983 |
| WO | 86/07224 | 12/1986 |
| WO | 96/11538 | 4/1996 |
| WO | 97015161 | 4/1997 |
| WO | 97/17790 | 5/1997 |
| WO | 9716924 A1 | 5/1997 |
| WO | WO9716890 A2 | 5/1997 |
| WO | 97048212 | 12/1997 |
| WO | WO97047094 | 12/1997 |
| WO | WO9810604 A1 | 3/1998 |
| WO | WO98025422 | 6/1998 |
| WO | WO9857509 A2 | 12/1998 |
| WO | WO9904583 A1 | 1/1999 |
| WO | WO9922466 A1 | 5/1999 |
| WO | 9930234 | 6/1999 |
| WO | WO99039524 | 8/1999 |
| WO | WO9944114 A1 | 9/1999 |
| WO | WO9949595 A1 | 9/1999 |
| WO | WO99049588 | 9/1999 |
| WO | WO9959355 | 11/1999 |
| WO | 99/62231 | 12/1999 |
| WO | WO9966657 A1 | 12/1999 |
| WO | 0002406 | 1/2000 |
| WO | WO0004718 A1 | 1/2000 |
| WO | WO000883 A1 | 2/2000 |
| WO | 0013436 A2 | 3/2000 |
| WO | WO00013356 | 3/2000 |
| WO | 0033535 | 6/2000 |
| WO | 0036804 | 6/2000 |
| WO | WO0041364 A1 | 7/2000 |
| WO | 0051308 | 8/2000 |
| WO | 00/52880 | 9/2000 |
| WO | 0056018 | 9/2000 |
| WO | WO0057601 A1 | 9/2000 |
| WO | WO0062547 A1 | 10/2000 |
| WO | WO00072609 | 11/2000 |
| WO | 0079734 | 12/2000 |
| WO | WO000074311 | 12/2000 |
| WO | WO0074425 A1 | 12/2000 |
| WO | WO0076125 A1 | 12/2000 |
| WO | WO0076234 A1 | 12/2000 |
| WO | WO0078008 A1 | 12/2000 |
| WO | 01001630 | 1/2001 |
| WO | 0110146 | 2/2001 |
| WO | WO01013358 | 2/2001 |
| WO | 01/19027 A2 | 3/2001 |
| WO | WO01020805 | 3/2001 |
| WO | WO0145443 | 6/2001 |
| WO | WO2002008449 | 1/2002 |
| WO | 0215578 A1 | 2/2002 |
| WO | WO0247407 A2 | 6/2002 |
| WO | WO2002047356 | 6/2002 |
| WO | 02061572 | 8/2002 |
| WO | 02080449 | 10/2002 |
| WO | WO02080454 A2 | 10/2002 |
| WO | WO02096150 | 11/2002 |
| WO | 02054663 | 1/2003 |
| WO | WO2003001772 | 3/2003 |
| WO | 03032573 | 4/2003 |
| WO | 03043310 A1 | 5/2003 |
| WO | 03051056 A1 | 6/2003 |
| WO | WO03051072 | 6/2003 |
| WO | WO03063418 A1 | 7/2003 |

(56) References Cited

FOREIGN PATENT DOCUMENTS

| WO | WO2004025895 A1 | 3/2004 |
| WO | WO2005008393 | 1/2005 |
| WO | WO2009130589 A1 | 10/2009 |

OTHER PUBLICATIONS

"Universal Mobile Telecommunications System (UMTS); Radio Interface for Broadcast/Multicast Services (3GPP TR 25.925 version 3.3.0 Release 1999)" ETSI TR 125 925 V3.3.0, Dec. 1, 2000, pp. 1-35, XP002230388, p. 17-18; Figure 6.5.

Berkovits, S. "How to Broadcast a Secret" Advances in Cryptology, Eurocrypt, International Conference on the Theory and Application of Cryptographic Techniques, Springer-Verlag, Delaware, Apr. 11, 1991, pp. 535-541.

Farinacci, D., et al., "Generic Routing Encapsulation (GRE), " Network Working Group Request for Comments 2784, Mar. 1-8, 2000. <URL:http://www.globecom.net/ieft/rfc/rfc2784.html> (retrieved on Feb. 14, 2003).

Handley, M. et al., "SDP: Session Description Protocol" Network Working Group, Request for Comments: 2327, Category: Standards Track. ISI/LBNL, Apr. 1998, pp. 1-42.

Jalali, A., et al. "Data Throughput of CDMA-HDR a High Efficiency-High Data Rate Personal Communication Wireless System," 2000 IEEE, pp. 1854-1858.

Jou, Y. "Developments in Third Generation (3G) CDMA Technology," 2000 IEEE, pp. 460-464.

Keeler, Robert E., "Interoperability Considerations for Digital HDTV," IEEE Transactions on Broadcasting, vol. 37, No. 4, Dec. 1991, pp. 128-130.

Linuxguruz. "Free On-Line Dictionary of Computing," § Internet Protocol, Dec. 2000.

Marchent, B.G., et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Menezes, A.J., et al. "Keying Layering and Cryptoperiods, Passage," Handbook of Applied Cryptography, CRC Press Series on Discrete Mathematices and its Applications, Boca Raton, FL, CRC Press, US, 1997, pp. 551-553, 577-581.

Rose, Greg, et al., "The Secure Real Time Transport Protocol," Internet Draft, Feb. 2001, pp. 1-26.

Schneier, Bruce. Applied Cryptography, Second Edition, 1996 John Wiley & Sons, Inc., pp. 182-184.

Shannon, C.E., "A Mathematical Theory of Communication," The Bell System Technical Journal, vol. 27, pp. 379-423, 623-656, Jul. Oct. 1948.

Simpson, W., "PPP in HDLC-Like Framing," Network Working Group, Request for Comments: 1662 (RFC 1662), Jul. 1994, pp. 1-17.

Tanenbaum, Andrew S.: Computer Networks, Third Edition; Pub. 1996: pp. 8, and 179-190.

International Search Report PCT/US02/09826, ISA, EPO, Dec. 9, 2002.

International Search Report PCT/US02/09829, ISA, EPO, Mar. 4, 2003.

International Search Report PCT/US02/09830, ISA, EPO, Mar. 10, 2003.

International Search Report PCT/US02/09831, ISA, EPO, Mar. 4, 2003.

International Search Report PCT/US02/09832, ISA, EPO, Nov. 26, 2002.

International Search Report PCT/US02/09833, ISA, EPO, Nov. 26, 2002.

International Search Report PCT/US02/09834, ISA, EPO, Feb. 27, 2003.

International Search Report PCT/US02/09835, ISA, EPO, Jul. 8, 2002.

International Search Report PCT/US03/26897, ISA, EPO, Jan. 16, 2004.

Bormann, C., et al., "Robust Header Compression (ROHC)," Internet Draft, Internet Engineering Task Force, Feb. 7, 2001, pp. 1-153, The Internet Society (ISOC). Reston, Virginia, USA.

Bormann, C., et al., "Robust Header Compression (ROHC): Framework and Four Profiles," Internet Draft, Internet Engineering Task. Force, Feb. 26, 2001, pp. 1-153, The Internet Society (ISOC), Reston, Virginia, USA.

Yamaguchi, S., "Realization of Multimedia Communications", Unix Magazine, Jun. 1. 1996. pages 45-53, vol. 11, No. 6, Ascii Corporation, Tokyo, Japan.

Foldoc, "Spread-spectrum communications", definition, dated Aug. 8, 2001, from <http://foldoc.org/index.cgi?query=spread+spectrum>.

Schneier, B.: "Applied Cryptography, Conference Key Distribution and Secret Broadcasting" Second Edition, pp. 520, 523-524, John Wiley & Sons, Inc. XP002248263 (1996).

Menezes. A. et al.: "Handbook of Applied Cryptography," Chapter 13, pp. 543-590, CRC Press (1996).

Menezes, A. et al.: "Handbook of Applied Cryptography," pp. 497-500, 551-552, CRC Press LIC, USA XP002248262 (1997).

Mooij, W.: "Advances in Conditional Access Technology", IEEE. pp. 461-464 (Sep. 1997).

Schneier, B.: "Applied Cryptography," Second Edition, pp. 170, 171, 173, John Wiley & Sons, Inc. (1996).

Stallings, W.: "Cryptography and Network Security," pp. 402-406, 413-417, 421-424, Prentice-Hall, Inc., XP002248261 (1995).

International Preliminary Examination Report. PCT/US2002/009829—International Preliminary Examining Authority—US, Mar. 31, 2005.

IEEE, "IEEE STD. 802.11, Part 11; Wireless LAN Medium Access Control (MAC) And Physical Layer (PHY) Specifications"1997, pp. 60-70.

Macq, Benoit M. et al., "Cryptology for digital TV Broadcasting", 1995 IEEE.

Tanenbaum, Andrew S,: Computer Networks: Second Edition: Pub 1993 XP2530414.

You Xiaohu, "D&R Progress on China'S 3G Mobile Communications", Telecom Science, vol. 2, 2001, pp. 11-17.

"Functional Model of a Conditional Access System", EBU Review—Technical European Broadcasting Union, Bussels, BE, No. 266; Dec. 21, 1995: pp. 64-77; XP000559450.

3G TS 25.213 V4.1.0 (Jun. 2001) 3rd Generation Partnership Project; Technical Specification Group Radio Access Network; Physical Channels and Mapping of Transport Channels Onto Physical Channels (FDD)(Release 4).

3GPP TS 25.211 V4.20. (Sep. 2001) 3rd Generation Partnership Project; Technical Specification Group Radio Access Network; Physical Channels and Mapping of Transport Channels Onto Physical Channels (FDD)(Release 4).

3GPP TS 25.212 V4.2.0 (Sep. 2001) 3rd Generation Partnership Project; Technical Specification Group Radio Access Network; Multiplexing and Chennel Coding (FDD)(Release 4).

3GPP TS 25.214 V4.2.0 (Sep. 2001) 3rd Generation Partnership Project; Technical Specification Group Radio Access Network; Physical Layer Procedures (FDD)(Release 4).

3GPP2 C.20002-0 Version 1.0 (Jul. 1999) 3rd Generation Partnership Project 2 "3GPP"Physical Layer Standard for cdma2000 Spread Spectrum Systems.

Al-Tawil, "A New Authentication Protocol for Roaming Users In GSM", Proceedings for IEEE International Symposium on Computer and Communication, Jul. 6, 1999, pp. 93-99.

Pannetrat et al., Authenticating Real-Time Packet Streams and Multicasts, 2002 IEEE. Computers and Communications, 2002. Proceesings. ISCC 2002. Seventh International Symposium on pp. 490-495.

B.G. Marchent et al., "Intelligent Control of Mobile Multimedia Systems"Vehicular Technology Conference 1998. VTC 98, 48th IEEE Ottawa, Canada, May 18-21, 1998; New York, USA, May 18, 1998, pp. 2047-2051.

Baccelli, F. et al., "Self Organizing Hierarchical Multicast Trees and Their Optimization,"INFOCOM 1999. IEEE, 1081-1089 (Mar. 21, 1999).

(56) References Cited

OTHER PUBLICATIONS

Baugher et al: "The Secure Real Time Transport Protocol (Draft 09)" Internet Engineering Task Force, AVT Working Froup, Internet -Draft, Jul. 2003, XP002320685.
Bormann, C. et al., "Robust Header Compression (ROHC)" Internet Draft, Dec. 2000, pp. 1-122, XP002901751 (pp. 4-5).
Bormann, et al., "Robust Header Compression (ROHC)," Internet Engineering Task Force IETF Draft, 1-145, Feb. 26, 2011.
Brown; "The Electronic Post it Note Model for Mobile Computing Applications," Computing Lab, The University, Canterbury, Kent, the Institution of Electrical Engineers, IEEE, Savoy Place, London, WC2R.OBL, UK.
ETSI: "Universal Mobile Telecommunications Systems (UMTS): Multimedia : Broadcast/Multicast Service (MBMS), Stage 1, 3GPP TS 22.146 version 5.2.0 Release 5", ETSI TS 22.146 v5.2.0. pp. 1-15, Mar. 2002.
Gong, L. at al., "Trade-Offs in Routing Private Multicast Traffic," Global Telecommunications Conference, 1995, IEEE, 2124-2128 (Nov. 13, 1995).
Kalliokulju J. "User Plane Architecture Of 3rd Generation Mobile Telecommunication Network," IEEE International Conference on Networks, ICON, Proceedings on Networks (ICON'99), Sep. 28, 1999-Oct. 1, 1999, pp. 270-278, XP010354980.
Lin, et al: "A Multicast Routing Protocol for Multichip Wireless Networks," Dept. of Computer Science and Information Engineering, Chung Cheng University, Taiwan, Global Telecommunications Conference, XP010373304.
Lou et al., "Progressive Video Streaming Over 2G and 3G Wireiess Systems," Proceedings of the 11th IEEE International Symposium on Personal Indoor and Mobile Radio Communications, vol. 2, Sep. 18-21, 2000, London, pp. 1550-1554.
Meier J. D. et al.,"Building Secure ASP.NET Applications: Authentication, Authorization, and Secure Communication: Cryptography, and Certificates" Microsoft Patterns & Practices. Nov. 2002, pp. 1-5, XP002321827.
Paul K. et al; "A Stability-Based Distributed Routing Mechanism to Support Unicast and Multicast Routing in AD HOC Wireless Network" Computer Communcations, Elsevier Science Publishers BV, Amsterdam, NL, vol. 24, No. 18, Dec. 1, 2001, pp. 1828-1845, XP0043.
Takahashi: "Prospect of Push type Information Providing Service/Technology" Information Processing, vol. 39, No. 11, Nov. 15, 1998, pp.1124-1131.
TIA/EIA/IS-856 Interim Standard cdma2000 High Rate Packet Data Air Interface Specification (Nov. 2000).
TIA/EIA/IS-95-A (Revision of TIA/EIA/IS-95) Mobile Station-Base Station Compatibility Standard for Dual-Mode Wideband Spread Spectrum Cellular System (May 1995).
Toh C-K et al: "Abam: On-Demand Associativity-Based Multicast Routing For AD HOC Mobile Networks," Vehicular Technology Conference, 2000. IEE, 987-993 (2000).
Waitzman, et al., "The Distance Vector Multicast Routing Protocol (DVMRP), "RFC 1075, Nov. 1, 1998.
Yang et al: "An Efficient Multicast Delivery Scheme To Support Mobile IP," Database and Expert Systems Applications, 1999, IEEE, 638-88 (Sep. 1, 1999).
Asaka et al., "Dynamic Multicast Routing Using Predetermined Path Search", Technical Report of IEICE (The Institute of Electronics, Information and Communication Engineers), SSE95-56 IN99-37 CS99-78, Sep. 27, 1999.
Tadaumi, "IP Technology as Communication Infra," The Institute of Electronics Information and Communication Engineers, column 83, No. 4, Apr. 2000, pp. 286-294.
William Stallings: "Cryptography and network security: Principles and Practice" Second Edition, 1999, Prentice Hall, New Jersey.
3GPP TS 25.214 v4.1.0(Jun. 2001) Universal Mobile Telecommunications System (UMTS); Physical layer procedures (FDD), Release 4, ETSI TS 125 214 V4.1.0, Jun 2001.
Alfred J. Menezes, Paul C. van Oorschot and Scott A. Vanstone. Handbook of Applied 085 Cryptography, CRC Press. (Oct. 1996): p. 364 (in particular, refer to section 9.6.3), http://www.cacr.math.uwaterloo.ca/hac/about/chap9.pdf.
Haverinen, et al., "EAP SIM Authentication" draft-haver inenpppext-eap-sim-11 .txt, [online] <URL:http://www.watersprings.org/pub/id/draft-haverinen-pppext-eap-sim- 11 ,txt> Jun. 2003, pp. 1-64.
JNSA, "Trend of the Latest Security Protocol IPsecH-with Demonstration Experiment Report for interconnection," Network Magazine, vol. 6, No. 6, Japan, Jun. 2001, vol. 6, pp. 86-93.
Okamoto, "Encryption Technology For Realizing A Bright Information Society 5: Management of Encryption Key Distribution", Bit, Japan, Kyoritsu Shuppan Co., Ltd., Nov. 1, 1991, vol. 23, No. 12, pp. 51-59.
Pelletier, et el., "Robust Header Compression (ROHC): A Profile for TCP/IP (ROHC-TCP)", Internet Draft, Feb. 21, 2005, pp. 1-2.
TIA/EIA/IS-95-B Mobile Station-Base Station Compatibility Standard for Dual-Mode Wideband Spread Spectrum Cellular System (IS-95 Standard), Feb. 3, 1999.
European Search Report—EP10004607, Search Authority—Munich Patent Office, Nov. 18, 2010 (020020EPD1).
European Search Report—EP10005810, Search Authority—Munich Patent Office, Nov. 10, 2010 (020020EPD2).
Haverinen H: "EAP SIM Authentication", 3GPP Draft; S3-010663_Draft-haverinen-ppext-EAP-SIM-0 1, 3RD Generation Partnership-Project (3GPP), Mobile Competence Centrel; 650, Route de Lucioles; F-06921 Sophia-Antipolis Cedex; France, vol. SA WG3, No. Sophia; 2011128, Nov. 28, 2001, XP050271835, [retrieved on Nov. 28, 2001].
Supplementary European Search Report—EP04777745, Search Authority—Berlin Patent Office, Dec. 14, 2010 (030400).
Taiwanese Search report—093124861—TIPO—Dec. 7, 2010 (060806).
Translation of Office Action in Japanese application 2002-577339 corresponding to U.S. Appl. No. 09/933,971 , citing JP11331070, JP2090840, JP2000115860 dated Oct. 19, 2010 (010439JP).
Bauer D., et al., "An error-control scheme for a multicast protocol based on round trip time calculations ", Local Computer Networks, 1996., Proceedings 21ST IEEE Conference on Minneapolis, MN, USA Oct. 13-16, 1996, Los Alamitos, CA, USA,IEEE Comput. Soc, US, Oct. 13, 1996, pp. 212-221, XP010200690, DOI: 10.1109/LCN. 1996.558149 ISBN: 978-0/8186-7617-8 * chapters 3 + 3.1*.
"Feature Story I: Evolution of Cellular Phones," ASCII, Dec. 1, 2000, vol. 24, No. 12, pp. 204.
Menezes, Alfred J., et al.,"Handbook of Applied Cryptography," 1997 CRC Press, pp. 169-190.
Mysore, J. P., et al., Performance of transport protocols over a multicasting-based architecture for Internet host mobility, Communications, 1998. ICC 98. Conference Record. 1998 IEEE International Conference on Atlanta, GA, USA June 7-11, 1998, New York, NY, USA, IEEE, US, vol. 3, Jun. 7, 1998, pp. 1817-1823, XP010284635, DOI : 10.1109/ICC. 1998.683142 ISBN: 978-07803-4788-5 * abstract * chapter 2 *.
Yajnik M., et al., "Packet loss correlation in the MBone multicast network", Global Telecommunications Conference, 1996. Globecom '96. 'Communications: The Key to Global Prosperity London, UK Nov. 18-22, 1996, New York, NY, USA, IEEE, US, Nov. 18, 1996, pp. 94-99, XP010220159, DOI: 10.1109/GLOCOM. 1996. 586133 ISBN: 978-0-7803-3336-9 * chapter 3.1*.
Ohnishi H., et al., "Proposed Scheme for Route Optimization on the Mobile IP Network," Technical Report of the Institute of Electronics, Information and Communication Engineers, SSE99-123 PS99-47, Dec. 17, 1999.
Taiwan Search Report—TW093120386—TIPO—Feb. 8, 2012 (030337TW).
European Search Report—EP2204939—Search Authority—Berlin—May 8, 2012 (020002EPD2).
R.Sinnarajah, Signaling Support for Broadcast Service, 3GPP2 TSG-C Contribution, 2002, C20-20020107-022, URL http://ftp.3gpp2.org /TSGC/Working/2002/TSG-C-0201/TSG-C-0201-Vancouver/WG2/C20-20020107-020 (Signal ing-Support-forBroadcast-Service).doc.

(56) References Cited

OTHER PUBLICATIONS

Qualcomm Europe: "MBMS Security Framework", 3GPP TSG SA WG3 Security—S3 #29 S3-030356, Jul. 2003, MBMS Security and 3GPP-3GPP2 joint meeting.
Romkey J., "A Nonstandard for Transmission of IP Datagrams Over Serial Lines: Slip", rfc1055, IETF, Jun., 1988, URL, http://www.ietf.org/rfc/rfc1055.txt.
3GPP2 C.R1001-A, "Administration of Parameter Value Assignments for cdma2000 Spread Spectrum Standards Release C" Jul. 14, 2000, Version 2.0.
Chen T., et al.,"cdma2000 Broadcast Services Stage 2: System Design",C10-20010820-008,3GPP2,Aug. 20, 2001.
European Search Report—EP10158699—Search Authority—Munich—Jun. 22, 2010 (010498EPD1).
Haverinen, H., "GSM SIM Authentication and Key Generation for Mobile IP"; draft-haverinen-nriobileip-gsmsimi-01.txt; Internet Engineering Task Force, IETF, CH; Nov. 2000; XP015014135.
Momona, M., et al., "Technologies and Standardization Activities in Cable TV Access Networks," IEICE Technical Report, Japan. The Institute of Electronics, Information and Communication Engineers (IEICE), Feb. 15, 1999. vol. 98, No. 589: pp. 57-64.
Brown; "The Electronic Post it Note Model for Mobile Computing Applications," Computing Lab, The University, Canterbury, Kent, The Institution of Electrical Engineers, IEEE, Savoy Piece, London, WC2R OBL, UK. 1995.
Estrin, et al., "The Protocol Independent Multicast-Sparse Mode (PIM-SM)," RFC 2362, Jun. 1998.
ETSI: "Universal Mobile Telecommunications Systems (UMTS); Multimedia Broadcast/Multicast Service (MBMS), Stage 1, 3GPP TS 22.146 version 5.2.0 Release 5", ETSI TS 22.146 v5.2.0, pp.1-15, Mar. 2002.
Gong, L. at al: "TRADE-Offs in Routing Private Multicast Traffic," Global Telecommunications Conference, 1995, IEEE, 2124-2128 (Nov. 13, 1995).
Kalliokulju J.: "Plane Architecture of 3rd Generation Mobile Telecommunication Network," IEEE International Conference on Networks, ICON, Proceedings on Networks (ICON'99), Sep. 28, 1999-Oct. 1, 1999, pp. 270- 278, XP010354980.
Lin, et al: "A Multicast Routing Protocol for Multichip Wireless Networks," Dept. of Computer Science and Information Engineering, Chung Cheng University, Taiwan, Global Telecommunications Conference, XP010373304, 1999.
Lou et al., "Progressive Video Streaming Over 2G and 3G Wireless Systems," Proceedings of the 11TH IEEE International Symposium on Personal Indoor and Mobile Radio Communications, vol. 2, Sep. 18-21, 2000: London, pp. 1550-1554.
Meier J D et al:. "Building Secure ASP.NET Applications: Authentication, Authorization, and Secure Communication: Cryptography, and Certificates" Microsoft Patterns & Practices. Nov. 2002, pp. 1-5, XP002321827.
Miyazaki: "A Stream-data Multicast Protocol Using IP Unicast Address" Technical Report of IEICE, IN2001-9, May 11, 2001.
Moy, "Multicast Extensions to OSPF," RFC 1584, Mar. 1994.
Paul K et al: "Stability-Based Distributed Routing Mechanism to Support Unicast and Multicast Routing in AD HOC Wireless Network"Computer Communcations, Elsevier Science Publishers BV, 2001.

\* cited by examiner

| LAYER | PROTOCOLS AND SELECTED OPTIONS FOR SERVICE OPTION XX |
|---|---|
| APPLICATION | MPEG-4 VISUAL, EVRC AUDIO, RTP PAYLOAD TYPES |
| TRANSPORT | RTP/UDP PORT NUMBER |
| SECURITY | UNSPECIFIED |
| NETWORK | IP |
| HEADER COMPRESSION | ROHC |
| LINK | HDLC-TYPE FRAMING |
| RLP | NULL |
| MULTIPLEX | BSPM |
| PHYSICAL | BSPM |

FIG. 4

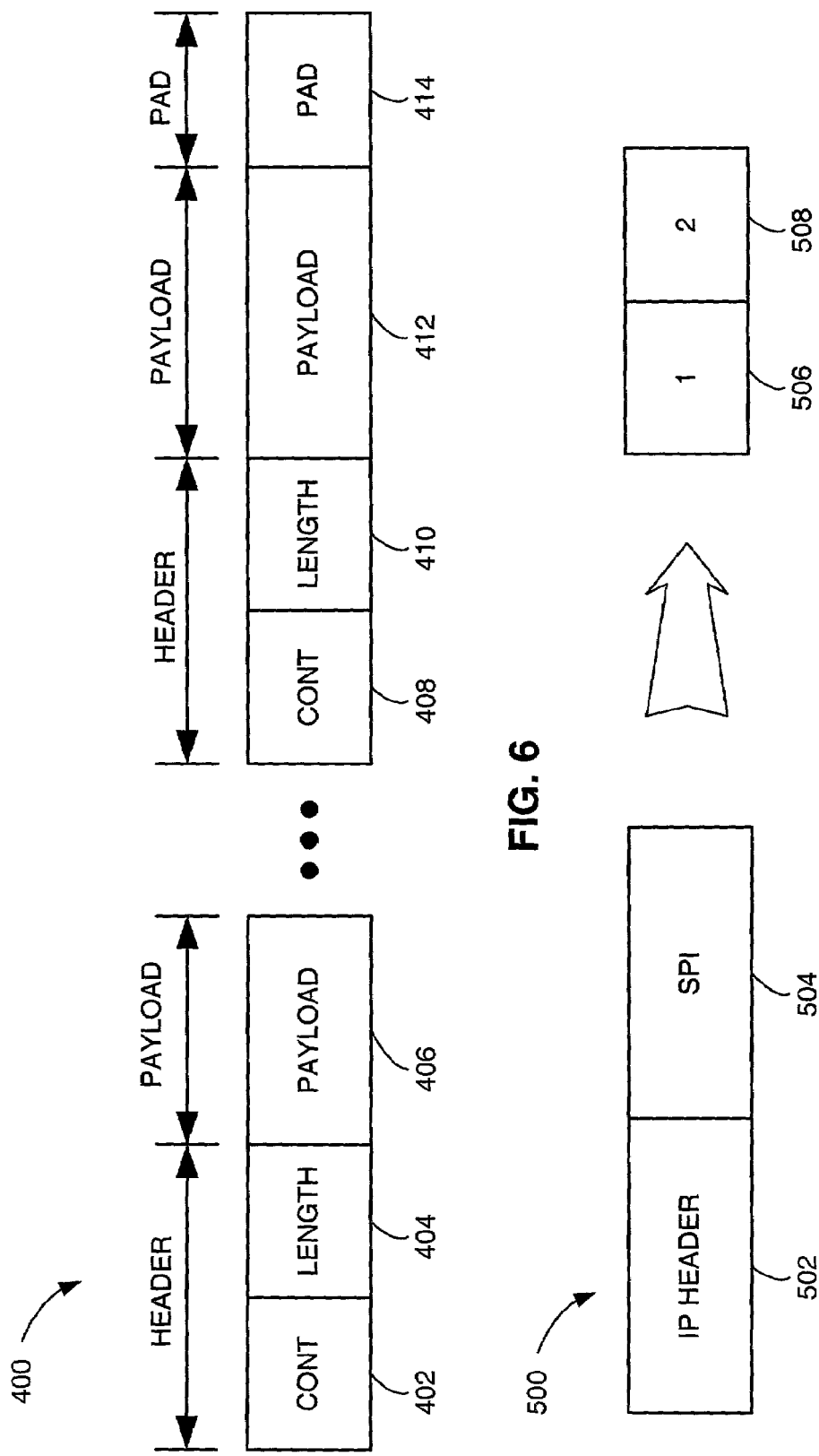

METHOD AND APPARATUS FOR TRANSMISSION FRAMING IN A WIRELESS COMMUNICATION SYSTEM

CLAIM OF PRIORITY UNDER 35 U.S.C. §120

The present Application for Patent claims priority of U.S. Provisional Application No. 60/279,970, filed 60/279,970, filed Mar. 28, 2001 assigned to The assignee hereof and hereby expressly incorporated by reference herein.

BACKGROUND

REFERENCE TO CO-PENDING APPLICATIONS FOR PATENT

The present invention is related to the following Applications for Patent in the U.S. Patent & Trademark Office:
- "Method and Apparatus for Security in a Data Processing System" by Philip Hawkes et al., having U.S. application Ser. No. 09/933,972, filed Aug. 20, 2001, and assigned to the assignee hereof, and which is expressly incorporated by reference herein;
- "Method and Apparatus for Overhead Messaging in a Wireless Communication System" by Nikolai Leung, having U.S. application Ser. No. 09/933,971, filed Aug. 20, 2001, and assigned to the assignee hereof, and which is expressly incorporated by reference herein;
- "Method and Apparatus for Out-of-Band Transmission of Broadcast Service Option in a Wireless Communication System" by Nikolai Leung, having U.S. application Ser. No. 09/934,021, filed Aug. 20, 2005, and assigned to the assignee hereof, and which is expressly incorporated by reference herein;
- "Method and Apparatus for Broadcast Signaling in a Wireless Communication System" by Nikolai Leung, having U.S. application Ser. No. 09/933,914, filed Aug. 20, 2001, and assigned to the assignee hereof and which is expressly incorporated by reference herein;
- "Method and Apparatus for Header Compression in a Wireless Communication System" by Raymond Hsu, having U.S. application Ser. No. 09/933,690, filed Aug. 20, 2001, and assigned to the assignee hereof, and which is expressly incorporated by reference herein; and
- "Method and Apparatus for Data Transport in a Wireless Communication System" by Raymond Hsu, having U.S. application Ser. No. 09/933,977, filed Aug. 20, 2001, and assigned to the assignee hereof, and which is expressly incorporated by reference herein.

Field

The present invention relates to wireless communication systems generally and specifically, to methods and apparatus for message compression in preparation for transmission in a wireless communication system.

Background

There is an increasing demand for packetized data services over wireless communication systems. As traditional wireless communication systems are designed for voice communications, the extension to support data services introduces many challenges. The conservation of bandwidth is the overwhelming concern for most designers The transmission protocols and data preparation methods used for a bi-directional communication may not be optimum for a uni-directional service, such as a broadcast service, wherein the bi-directional communication requires information not used in the unit-directional transmission. There is a need, therefore, for an efficient and accurate method of uni-directional transmission in a wireless communication system.

SUMMARY

Embodiments disclosed herein address the above stated needs by providing a method for framing data packets in a data processing system.

In one aspect, a method for framing packets in a wireless transmission system supporting broadcast transmissions includes generating a portion of an Internet Protocol (IP) packet for transmission, appending a start of frame indicator to the portion of the IP packet, applying an error checking mechanism to the portion of the IP packet, preparing a frame for transmission, having the start of frame indicator, the portion of the IP packet, and the error checking mechanism, and transmitting the frame without protocol information.

In another aspect, a communication signal transmitted via a carrier wave, having a payload portion corresponding to at least a portion of an Internet Protocol (IP) packet of digital information, a start of frame portion corresponding to the payload portion, and identifying a status of the payload portion within an IP packet, and an error checking portion for verifying the payload portion.

In still another aspect, a method for receiving framed packets in a wireless transmission system supporting broadcast transmissions includes receiving a frame of a packet transmission, the frame having a start of frame portion, a payload portion, and an error check portion, the frame not including protocol information, identifying the frame as a start frame in the packet transmission, verifying the frame using the error check portion of the frame, and processing the payload portion of the frame.

In yet another aspect, a computer program stored on a computer-readable storage unit, the computer program for receiving framed packets in a wireless transmission system supporting broadcast transmissions, the computer program includes a first set of instructions for receiving a frame of a packet transmission, the frame having a start of frame portion, a payload portion, and an error check portion, the frame not including protocol information, a second set of instructions for identifying the frame as a start frame in the packet transmission, a third set of instructions for verifying the frame using the error check portion of the frame, and a fourth set of instructions for processing the payload portion of the frame.

BRIEF DESCRIPTION OF THE DRAWINGS

FIG. 4 is a table of protocols applied to layers of a protocol stack supporting a broadcast service option in a wireless communication system.

FIG. 6 is a broadcast stream in a wireless communication system.

FIG. 7 is a header compression mapping in a wireless communication system.

DETAILED DESCRIPTION

Figure 1:
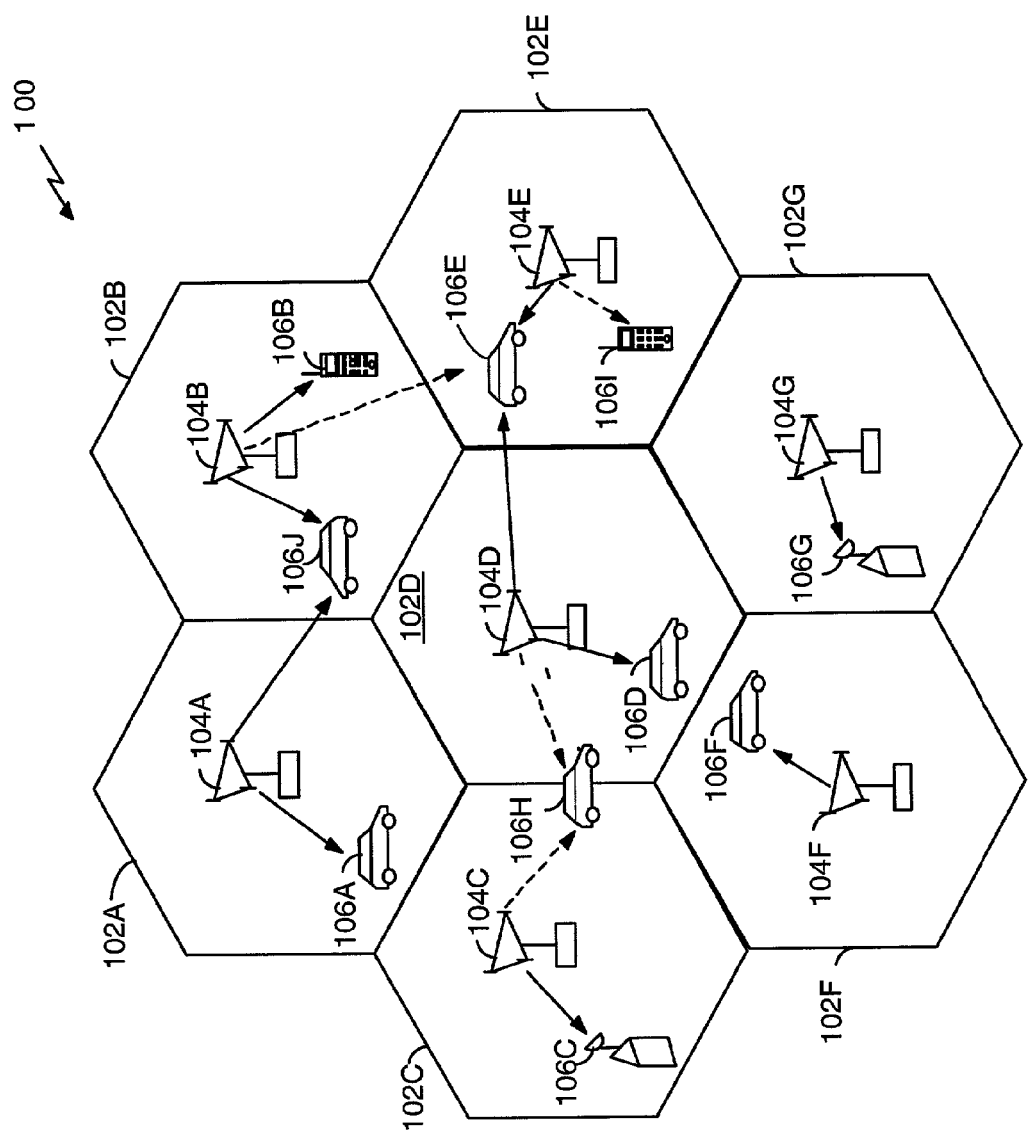
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments.

Optimization of a system consistent with the broadcast service is desirable in a wireless communication system to conserve a critical resource: the available bandwidth. The efficient use of available bandwidth impacts the performance and breadth of the system. Toward that end, various techniques have been applied to reduce the size of overhead information transmitted along with the data or content information as well as to reduce the size of the data transmitted. For example, in a digital transmission, data is transmitted in frames. The frames may be part of a packet of data, part of a data message, or continuous frames in a stream of information, such as audio and/or video streams. Attached to each frame of data (and each packet or message) is a header containing processing information that allows the receiver to understand the information contained in the frame(s). This header information is considered overhead, i.e., processing information transmitted along with information content. The information content is referred to as the payload. While each individual header is typically much smaller than a given payload, the cumulative effect of transmitting headers impacts the available bandwidth.

An exemplary embodiment of a wireless communication system employs a method of framing that reduces the size of the frame while satisfying the accuracy and transmission requirements of the system. The exemplary embodiment supports a unidirectional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

The following discussion develops the exemplary embodiment by first presenting a spread-spectrum wireless communication system generally. Next, the broadcast service is introduced; wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed Note that the exemplary embodiment is provided as an exemplar throughout this discussion; however, alternate embodiments may incorporate various aspects without departing from the scope of the present invention. Specifically, the present invention is applicable to a data processing system, a wireless communication system, a unidirectional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA200 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single multiple transmit and receive antennas.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G. each of which is serviced by a corresponding base station 104A through 104G, respectively. It is appreciated what the term "base station 104," used throughout the specification, refers to "base stations 104A, 104B, 104C, 104D, 104E, 104F and 104G." The term "base station 104" is used for the sake of conciseness, only. In the exemplary embodiment some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As Shown in FIG. 1, various terminals 106 are dispersed throughout the system. It is appreciated that the term "terminal 106," used throughout the specification, refers to "terminals 106A, 106B, 106C, 106D, 106E, 106F and 106G." The term "terminal 106" is used for the sake of conciseness, only. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System," which is assigned to the assignee of the present invention.

The downlink, or FL, refers to transmission from the base station to the terminal, and the uplink, or RL, refers to transmission from the terminal in the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

High Speed Broadcast System (HSBS)

Figure 2:
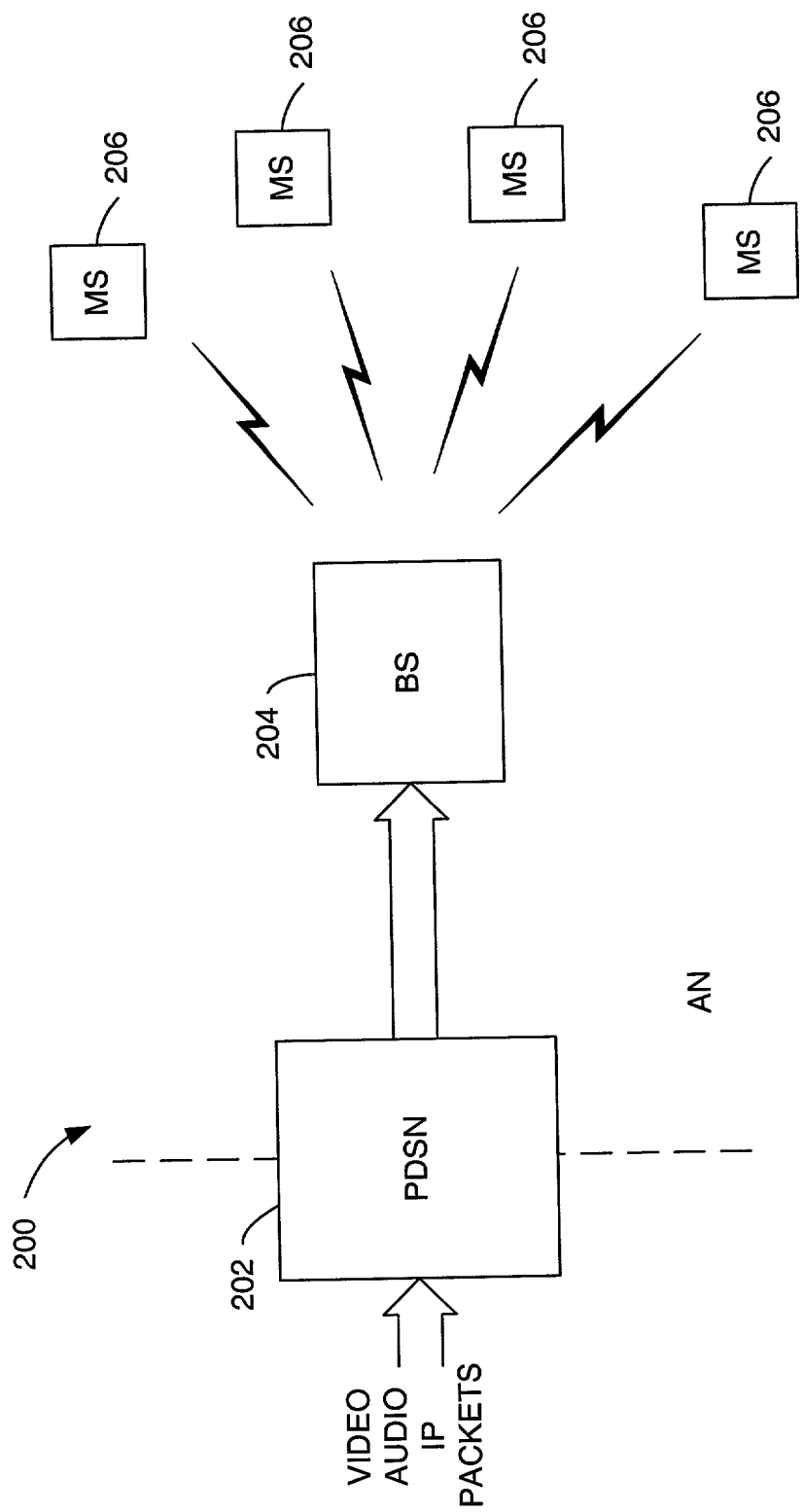
FIG. 2 is a block diagram of the communication system supporting broadcast transmissions.

A wireless communication system 200 is illustrated in FIG. 2, wherein video and audio information is provided to Packetized Data Service Network (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, ect. The time based scheduling is analogous to a single TV channel. The "Broadcast channel" refers to a single forward link physical channel i.e., a given Walsh Code, that carreies broadcast traffic. The Broadcast Channel, BCH, corresponds to a signal CDM channel.

The HSBS is a stream of information provided over an air interface in a wireless communication system. The "HSBS channel" refers to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code, that carries broadcast traffic. The Broadcast Channel, BCH, corresponds to a single CDM channel.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as a Content Server (CS), wherein the CS advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast content may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into substreams of lower rates.

One embodiment also supports group calls in several different ways. For example, by using existing unicast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the F-BSCH of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, which provides an acceptable video quality for SKT; (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Model

There are several possible subscription/revenue models for HSBS service, including free access, controlled access, and partially controlled access. For free access, no subscription is needed by the to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

There are several possible subscription/revenue models for HSBS service, including free access, controlled access, and partially controlled access. For free access, no subscription is needed by the user to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
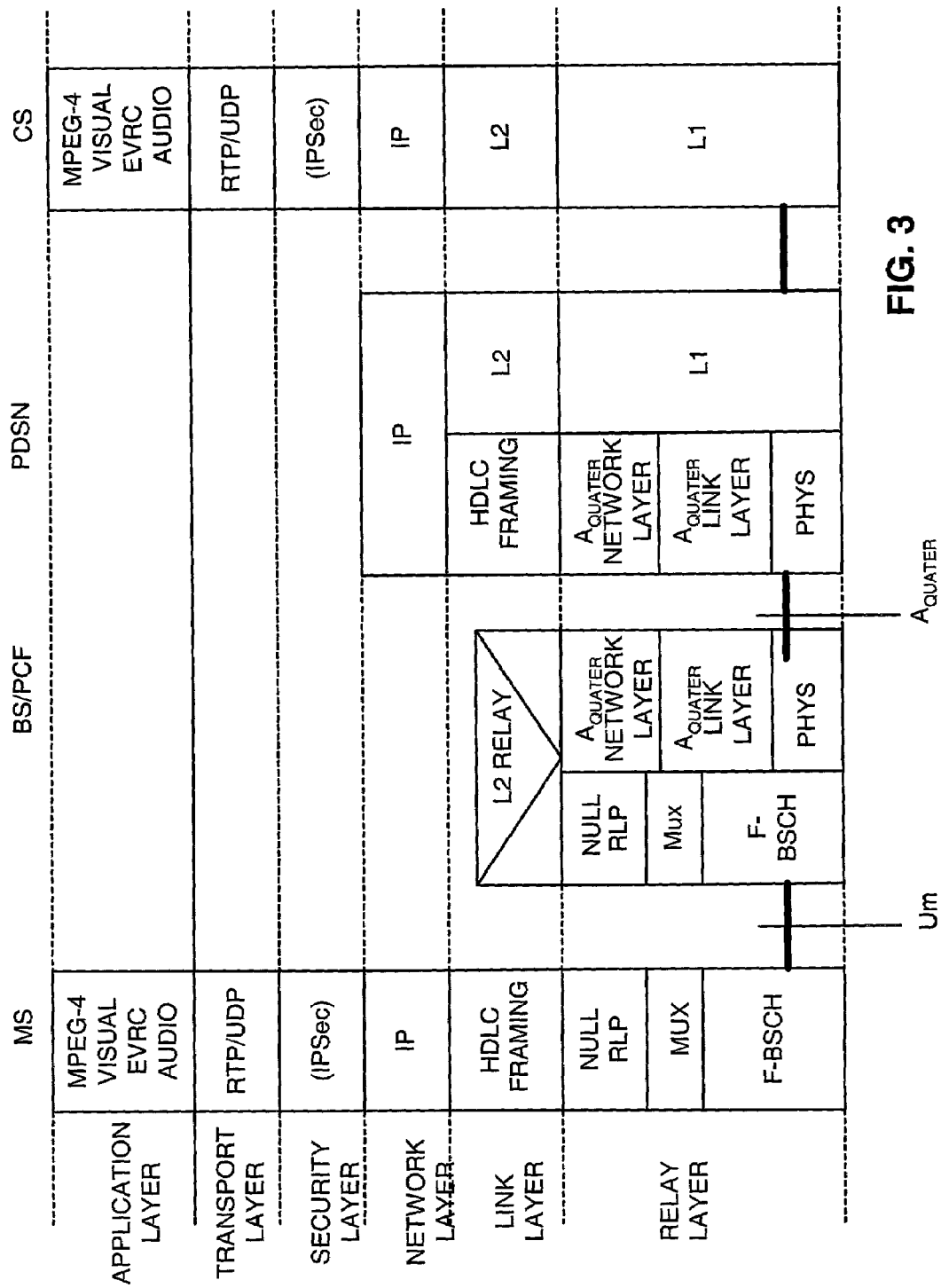
FIG. 3 is a model of the protocol stack corresponding to a broadcast service option in a wireless communication system.
Figure 5:
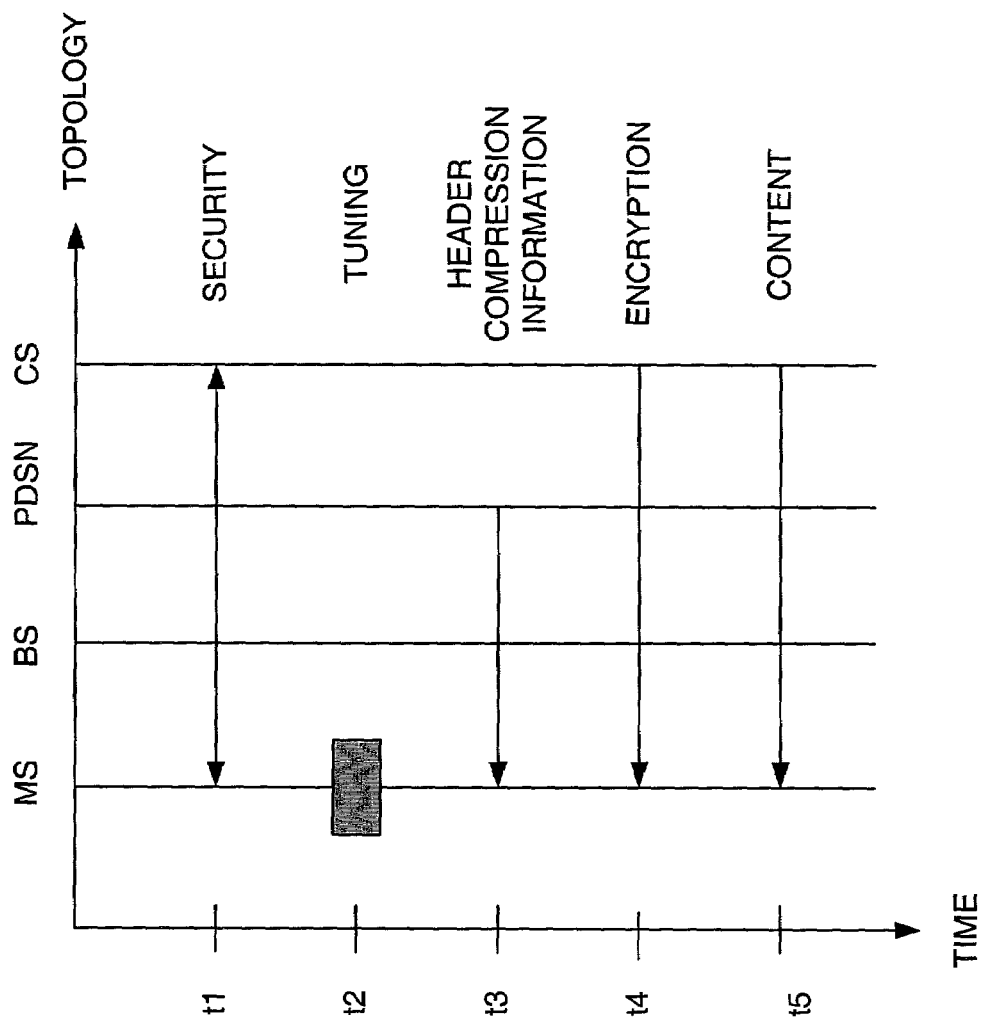
FIG. 5 is a flow diagram for a message flow for broadcast service in a wireless communication system topology.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port. The security layer of the MS is specified by the protocol, wherein security parameters are provided via out-of-band channels when the security is initially associated with the CS. The network layer specifies the IP header compression parameters.

Message Flow

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port to be used to carry the RTP packets. The security layer of the MS is specified by the protocol (IP sec), wherein security parameters are provided via out-of-band channels when the security association is initially established with the CS. The link layer specifies the IF header compression parameters. As illustrated, processing information used for transmission by the CS and rectuired by the MS, is not necessarily needed to be known by the BS/PCF or PDSN. Such information may include IPsec information. MPEG information, etc.

At time t2 the MS tunes into the broadcast channel and starts to receive packets. At this point in time, the MS is unable to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Compression

According to the exemplary embodiment, broadcast content is transmitted on a dedicated broadcast channel. The transport layer provides encryption overhead for carrying broadcast content in IP packets. The system supports data compression, and specifically header compression. The decision to compress data depends on the required average throughput (including transport/encryption overhead, data link layer overhead, and physical layer overhead) and user perception of the broadcast quality. Carrying more broadcast content in each IP packet reduces overhead and thus reduces the broadcast channel bandwidth. In contrast, compression increases the Packet Error Rate (PER) that affects user perception. This is due to the transmission of each long IP packet spanning multiple physical layer frames and thus is associated with increases in the Frame Error Rate (FER). If a carrier decides to use small IP packets to improve broadcast quality, the carrier may choose header compression to reduce the transport and encryption overhead of the IP packet.

The RTP/UDP/IP protocols are used to transport broadcast content from the CS to MS, and the content is protected by the Encapsulation Security Payload (ESP) in transport mode. The transport overhead is the RTP/UDP/IP header and is 40 bytes per IP packet data. The encryption overhead is in the form of ESP header, Initialization Vector (IV), and ESP trailer. The ESP header and IV are inserted between the IP header and UDP header. The ESP header consists of the Security Parameter Index (SPI) (4 bytes) and Sequence Number (4 bytes). The length of IV is specific to which encryption algorithm is used. For the AES Cipher Algorithm, the length of IV is 16 byte. The ESP trailer is appended to the end of the UDP datagram and consists of the padding, next header (1 byte), and padding length (1 byte). Since the cipher block size of the AES algorithm is 16 bytes, the padding size ranges from 0 to 15 bytes. Taking the ceiling function of the average padding size yields 8 bytes. For an IP packet the total overhead due to transport and encryption ranges from 66 to 81 bytes with the average of 74 bytes not including the data link layer overhead from the PDSN to the MS.

Header compression such as the Robust Header Compression (ROHC) may be used to reduce the IP header and the SPI field of the ESP Header from 24 bytes to 2 bytes. The Sequence Number of the ESP header is not compressed, because it is used to sequence the compressed packets. The IV is not compressed, because it changes randomly for every packet. The UDP/RTP header and ESP trailer cannot be compressed because they are encrypted. Therefore, if ROHC is used to compress the IP/ESP header, the average overhead due to transport and encryption is reduced from 74 bytes to 52 bytes per IP packet.

Figure 8:
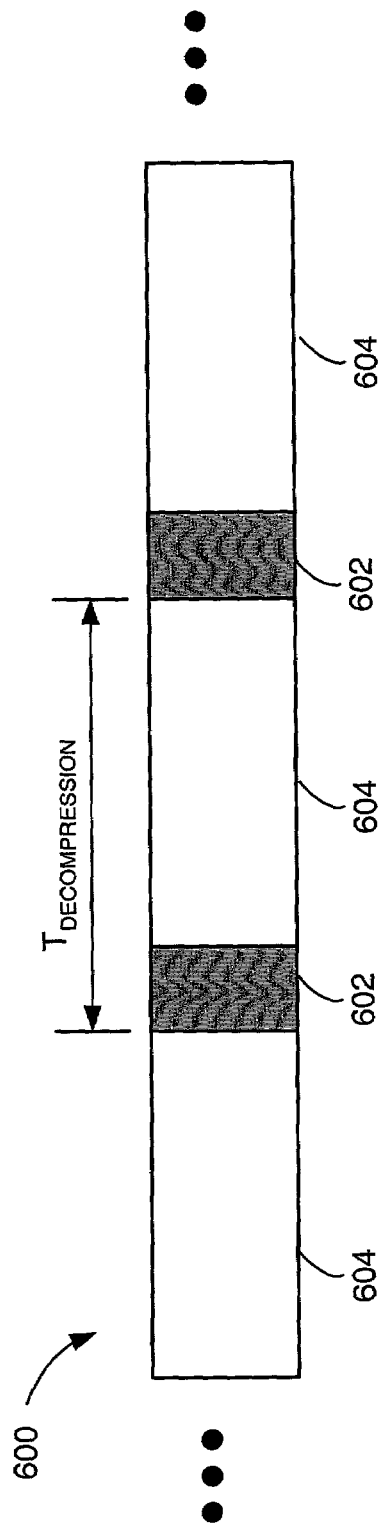
FIG. 8 is a periodic broadcast of header compression information.

According to the exemplary embodiment, header compression, such as the Robust Header Compression (ROHC), is applied so as to avoid propagating decompression errors. As illustrated in FIG. 7, the header information is compressed from 24 bytes down to 2 bytes. The header 500 includes an IP header 502 and a SPI portion 504. The compression algorithm results in a 2-byte result after compression. In contrast to conventional header compression, wherein some type of negotiation is required between the MS and the PDSN or other infrastructure element, the exemplary embodiment provides a uni-directional transmission of compression information. The MS does need to request the compression information, i.e., header compression parameters sufficient for decompression of the received information at the MS. Rather, the PDSN provides the compression information periodically as illustrated in FIG. 8. The PDSN provides the compression information on the broadcast channel interspersed with broadcast content. The provision of control information within a data stream is referred to as "in-band" as a separate channel is not required. As illustrated, the broadcast stream 600 includes broadcast content portions 604 and decompression information, i.e., compression information, 602. The decompression information is provided having a period of $T_{DECOMPRESSION}$. Alternate embodiments may provide the decompression information on occurrence of a predetermined event rather than periodically. As the MS does not request the decompression information, the PDSN supplies the information with a frequency that prevents delays in accessing the broadcast content. In other words, the PDSN should provide the information often, so that an MS may access the broadcast at any time without having to wait for decompression information.

Note that ROHC may be operated in a unidirectional mode, wherein, packets are sent in one direction only: from compressor to decompressor. In this mode, therefore, makes ROHC usable over links wherein a return path from decompressor to compressor is unavailable or undesirable. Before the MS can decompress packets received from the broadcast channel, the state of decompressor is initialized. The Initialization & Refresh (IR) packet is used for this purpose. There are two alternatives for the ROHC initialization.

The subscriber "tunes" to the broadcast channel and waits for the ROHC IR packets periodically sent by the ROHC compressor in the PDSN. Frequent ROHC IR packets may be needed for the MS to start decompressing received packets quickly. Frequent ROHC IR packets may use too much bandwidth in the broadcast channel. An IR packet is about 30 bytes for the IP/ESP compression profile. If an IR packet is sent once every 250 ms., the process consumes about 1 kbps in the broadcast channel. Losing IR packets over the air would further delay the MS to acquire ROHC initialization.

If decompression goes out-of-sync, due to packet loss, or residual error in the received compressed header, or failure, etc., the resultant decompression error may propagate until decompression is re-synchronized or re-initialized. An ROHC compressed header contains a Cyclic Redundant Check (CRC), which is calculated over the entire header before compression. This CRC allows decompression to perform a local context repair that brings the context in sync (in the events of packet loss and residual error). When decompression recovers from a failure, periodic IR packets effectively reinitialize the decompression process.

Data Link Layer

A data link layer framing protocol or transport layer protocol is applied between the PDSN and the MS to delineate packets received from the broadcast channel. With reference to FIG. 3, information in the transport layer, identified as LINK LAYER, is provided between the PDSN and the MS. The framing information is generated at the PDSN and is provided to the MS via the BS. The PDSN receives IP streams from the CS and frames the IP streams according to a predetermined framing protocol. As illustrated in the exemplary embodiment, the PDSN applies a framing protocol version of the High-Level Data Link Control (HDLC). The HDLC specified in the ISO standard corresponds to Layer 2 of the International Standards Organization (ISO) 7-layered architecture, wherein Layer 2 is referred to as the Data Link Layer. The HDLC protocol seeks to provide error-free movement of data between network nodes. To this end, the HDLC layer is designed to ensure the integrity of data passed to a next layer. In other words, the framing protocol seeks to reproduce the data received exactly as the data was originally transmitted, without errors, without loss of information, and in the correct order.

Figure 9:
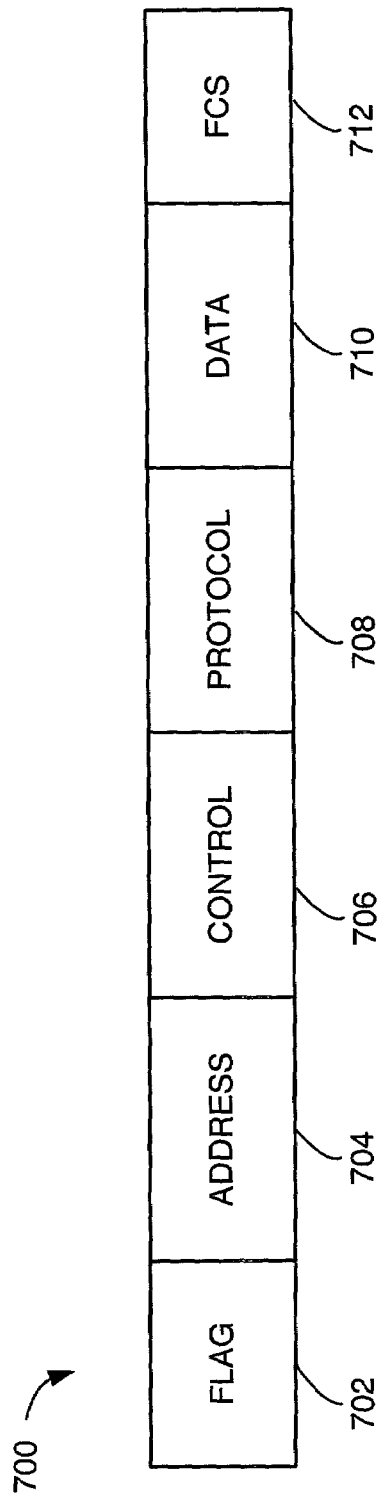
FIG. 9 is a header compression protocol.

The exemplary embodiment applies a version of HDLC framing that applies a subset of the HDLC defined parameters. FIG. 9 illustrates one embodiment of HDLS framing, wherein frame 700 includes a plurality of fields as defined by the HDLC protocol outlined in RFC 1662. Field 702 defines a FLAG or indication of a start of frame. The FLAG has a designated bit length and is defined by a predetermined pattern of bits. The HDLC is convenient to apply as the HDLC is a commonly available standardized protocol. One disadvantage of the full HDLC framing protocol is the processing time required to generate the frames at the transmitter and to retrieve the frames at the receiver.

In particular, the HDLC protocol is considered processor intensive as further processing is used to ensure the payload does not include the same sequence of bits as the FLAG. At the transmitter, if a FLAG sequence of bits is detected in the payload, an escape character is inserted into the payload to identify the FLAG as part of the payload and not indicating a start of frame. The process of adding an escape character is referred to as "escaping" hexadecimal patterns of 0x7E and 0x7D in the frame payload. An alternative method referred to as the Efficient Framing Protocol that is less processor intensive than the HDLC-like framing is described hereinbelow. FIG. 9 illustrates the options of using HDLC framing to transport PPP frame. For the HSBS operation, the HDLC-like framing overhead can be reduced by eliminating field that are not required, or have little meaning and/or provide little information, for a uni-directional broadcast. As described hereinabove, the FLAG is a predetermined sequence of bits indicating the beginning of an HDLC frame. The exemplary embodiment incorporates a FLAG or other start of frame indicator 802, as illustrated within the format 800 of FIG. 10. In contrast to the format of FIG. 9, the end of a frame is not indicated with overhead information in the exemplary embodiment. As the address and control fields of the format 700 have static values, these are not included in the format 800.

Figure 10:
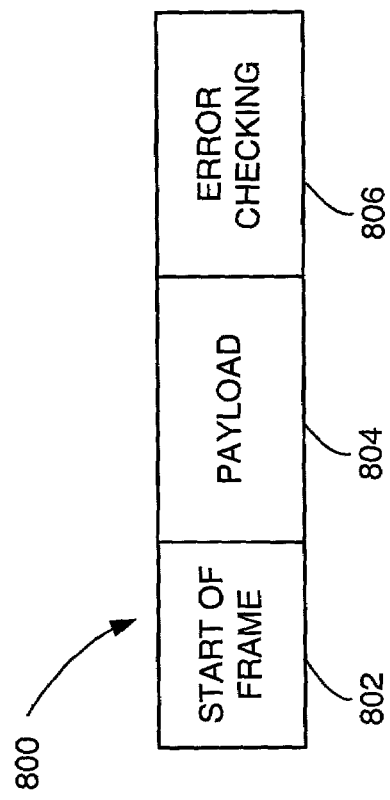
FIG. 10 is a header compression protocol for broadcast service in a wireless communication system.

Continuing with FIG. 10, as the purpose of the Protocol field 708 (FIG. 9) is to identify the payload type, such as LCP control packet, ROHC packet, IP packet, etc., this discriminator is not required for broadcast operation as all packets in the broadcast channel belong to the same type. For example, if ROHC compression is used for packet transmission, all packets in the broadcast channel are processed as ROHC packets. The types of ROHC packets, such as IR packet, compressed packet, etc., are distinguished by the Packet Type field in the ROHC packet header. Therefore, the Protocol field is not included in format 800. Further, the format 800 includes an error checking field 806 after the payload 804. The error checking field 806 provides information to the receiver to allow the receiver to check for errors in the received payload. The exemplary embodiment incorporates a Frame Check Sum (FCS) which may be specified as null, 16 bits, or 32 bits. Since an HDLC frame may span multiple physical-layer frames in the broadcast channel, it is recommended to use a 16-bit FCS.

The octet stuffing procedure defined in RFC 1662 is also applied to the exemplary embodiment, wherein after the FCS computation, the HDLC transmitter in the PDSN examines each byte in the HDLC frame (excluding the Flag) for the patterns of 0x7E and 0x7D. The pattern 0x7E will be encoded as 0x7D and 0x5E, and the pattern 0x7D will be encoded as 0x7D and 0x5D. The HDLC transmitter will not encode any other patterns. This implies that the Async-Control-Character-Map (ACCM) as defined in RFC 1662 is set to all zero.

The HDLC framing overhead is 3 bytes plus the octet stuffing overhead. Assuming the byte pattern is uniformly distributed, the average octet stuffing overhead is one byte per 128-byte of HDLC frame. For example, if the payload is 256 bytes, the HDLC framing overhead is 5 bytes on the average.

Figure 11:
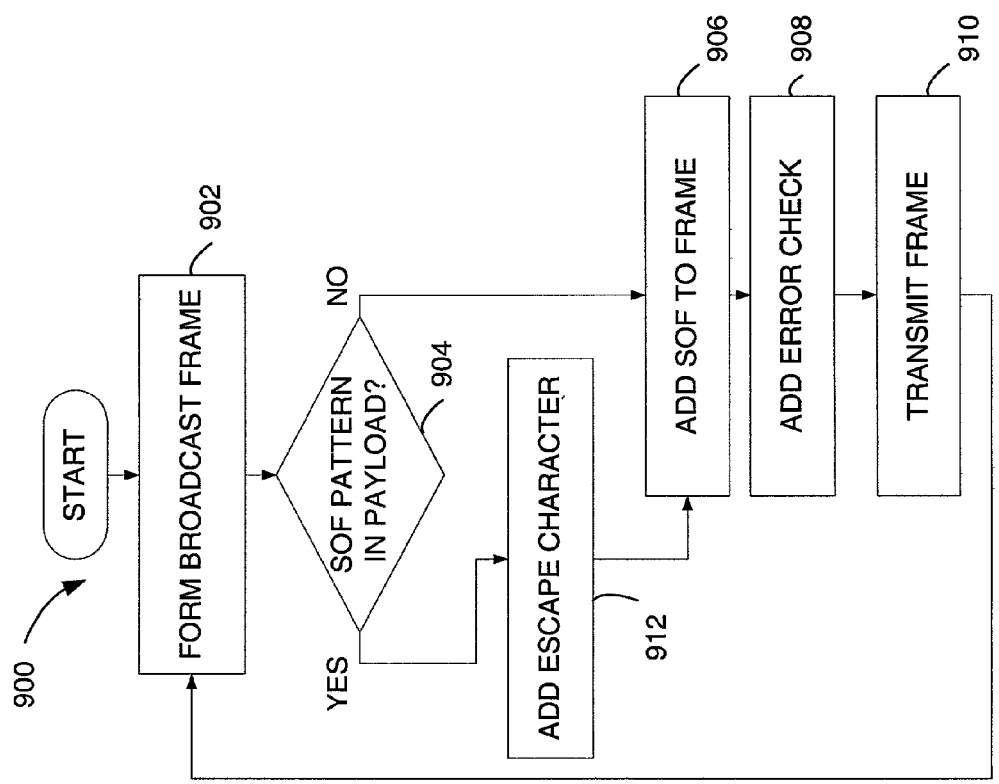
FIG. 11 is a flow chart of header compression for broadcast service in a wireless communication system.

FIG. 11 is a flow diagram of a framing method 900 performed at the transmitter. The transmitter forms the broadcast frame at step 902 by determining a payload portion of the packetized data and generating a Start Of Flag (SOF). The transmitter then checks the frame for any SOF sequences contained in the payload 904. If an SOF sequence is found in the payload, the transmitter adds an escape character at step 912. Else, the transmitter appends the SOF to the payload at step 906 and provides an error checking mechanism at step 908. The frame is transmitted at step 910. The transmitted frame has the format 800 of FIG. 10. Alternate embodiments may implement other fields within the framing format and may incorporate any form of classifier to locate a SOF sequence in the payload.

Figure 12:
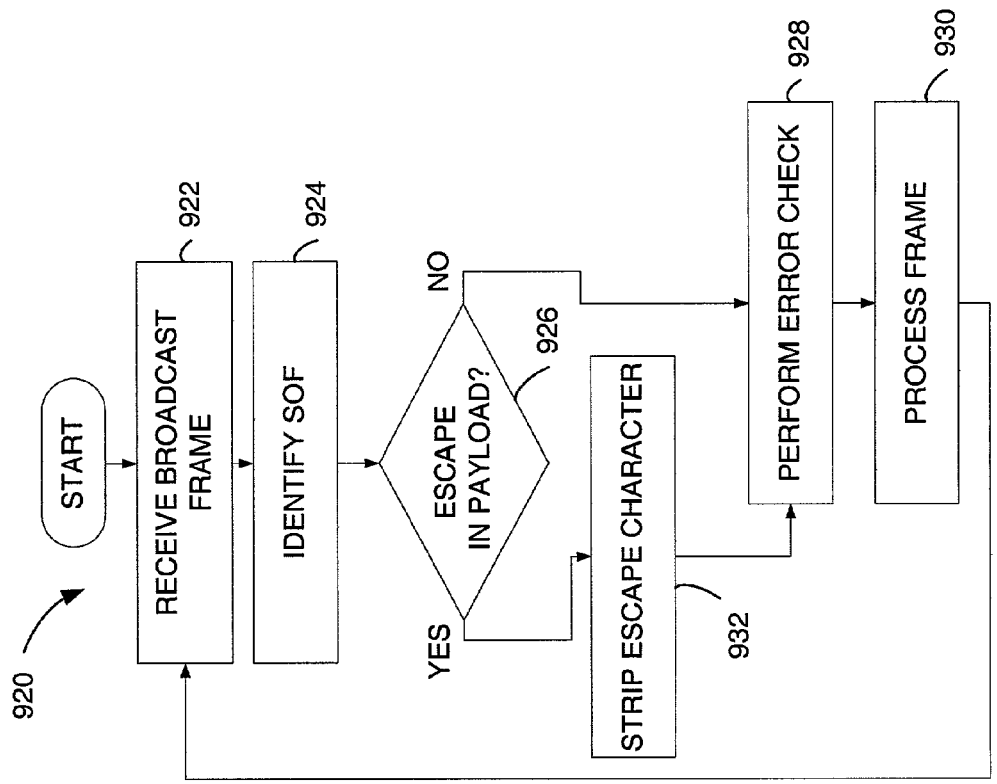
FIG. 12 is a flow diagram of header decompression for broadcast service in a wireless communication system.

FIG. 12 is a flow diagram of a de-framing method 920 performed at the receiver. The process starts on receipt of a broadcast frame at step 922. The receiver identifies a SOF at step 924, and checks for escape characters in the payload at decision diamond 926. If an escape character, or other SOF sequence identifier, is found in the payload, the receiver strips the escape character at step 932. Else, the receiver performs an error check at step 928 and processes the frame at step 930.

Figure 15:
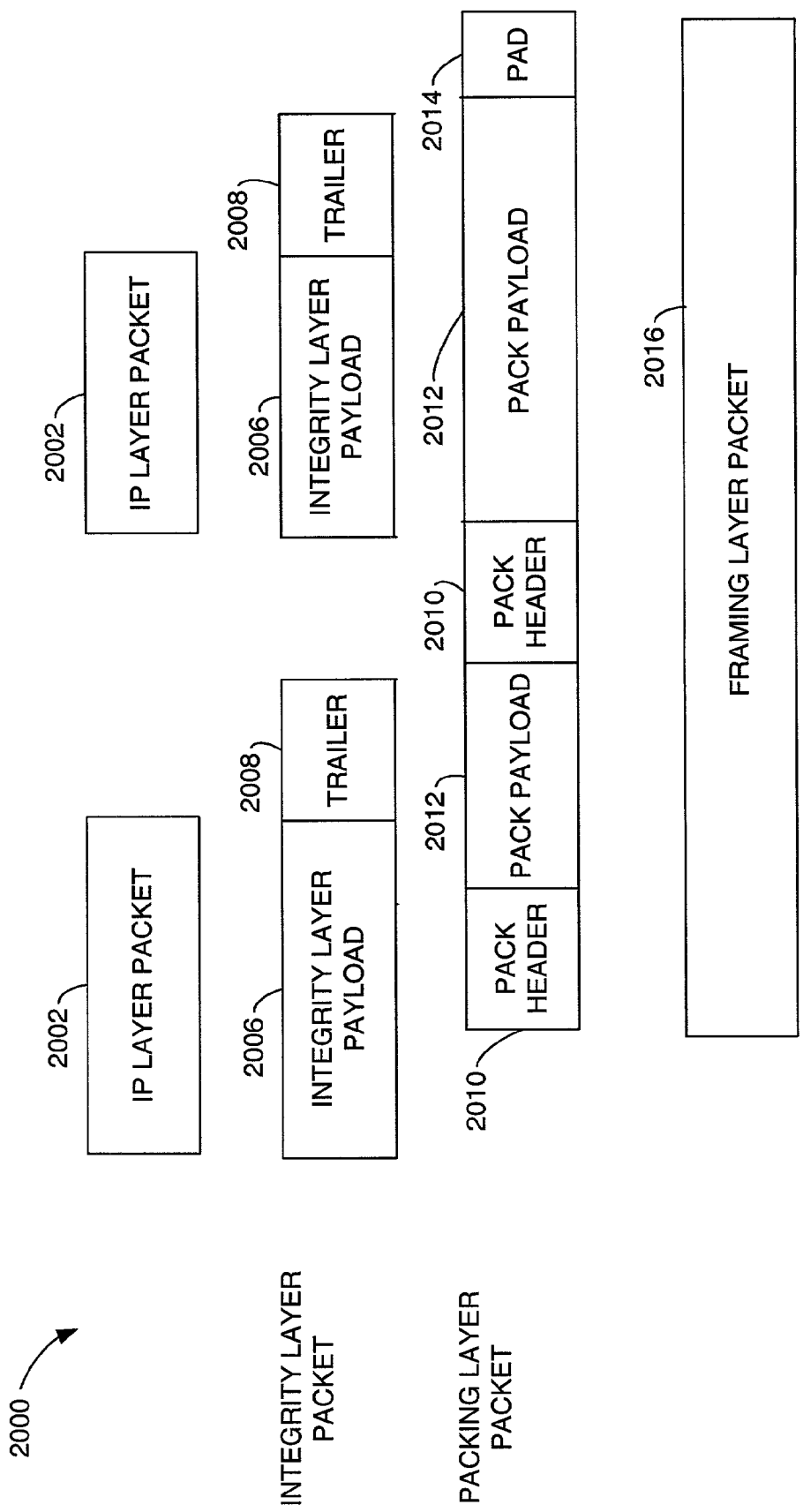
FIGS. 15-17 illustrate a framing protocol.

An alternative embodiment incorporates a framing protocol that does not use the octet based HDLC-like framing used seeking to avoid the processor intensive operations which use octet stuffing (referred to as "escaping"). Instead, this alternative uses a packet-based framing layer which is less processor intensive and is referred to herein as the "efficient framing protocol." FIG. 15 illustrates the process and protocol 2000 for formation of a framing layer packet 2016 from IP layer packets 2002, integrity layer packets, and packing layer packets. The framing layer processing 2000 packs variable length packets received from an upper layer, such as the IP Layer, into fixed length packets 2016 and passes the resulting framing layer packets 2016 to the lower layer, i.e., the physical layer (not shown). The framing layer allows the receiver to determine upper layer packet boundaries and validate the upper layer packet integrity.

As illustrated, process 2000 includes several sub-layers of processing, including an integrity layer and a packing layer. The integrity layer forms an integrity layer payload portion 2006 from the IP layer packet 2002 and appends a trailer 2008. In one embodiment, the integrity layer payload portion 2006 includes the IP layer packet 2002; however, alternate embodiments may include a portion of the IP layer packet 2002 or multiple IP layer packets 2002, or any combination thereof. The trailer 2008 may be the integrity checking mechanism.

The integrity layer appends an integrity check field or trailer 2008 to each IP layer packet 2002, i.e. packets received from the upper layer which in this case is the IP layer. The integrity layer then passes the resulting integrity layer packets 2006, 2008 to a lower layer, which in this case is the packing layer. The packets are further processed to form the framing layer packets 2016 and transmitted via the physical layer. At the receiver, packets are received via the physical layer and provided to the higher layers. The integrity layer at the receiver processes the integrity checking mechanism, i.e., trailer, and thus allows the receiver to validate the integrity of packets received from the lower layer before passing them to the upper layer. The format of the integrity layer is illustrated in FIG. 16, discussed hereinbelow.

Continuing with FIG. 15, the integrity layer passes the integrity layer packets 2006, 2008, to the packing layer for formation into packing layer packets. The packing layer forms a packet having at least one packing header, or pack header 2010, at least one packing payload, or pack payload 2012, and a pad 2014. The illustrated embodiment includes multiple pack payloads 2012, each having an associated pack header 2010. Alternate embodiments may incorporate any number of pack payloads 2012 and pack headers 2010. From the packing layer, process 2000 then generates a framing layer packet 2016 for provision to the physical layer (not shown).

The packing layer packs variable length packets received from the upper layer (e.g., the integrity layer) into fixed length packing layer packets 2016 and passes the resulting packing layer packets 2016 to a lower layer (e.g., the physical layer). The packing layer allows the receiver to determine upper layer packet boundaries.

Figure 16:
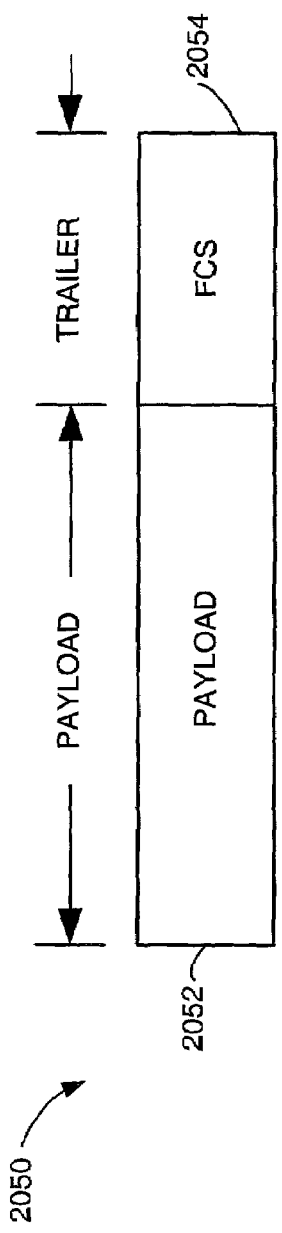

FIG. 16 illustrates the format 2050 of the integrity layer packet (packet 2006, 2008 of FIG. 15). As illustrated the format 2050 includes two portions: payload field 2052 and Frame Check Sequence (FCS) field 2054. The payload portion 2052 is a variable length field that contains the octets of exactly one upper layer packet. The FCS portion 2056 is a 32-bit field that contains the FCS for the payload. The FCS is a 32-bit CRC calculated over the payload field. Alternate embodiments may implement other error checking mechanisms.

Figure 17:
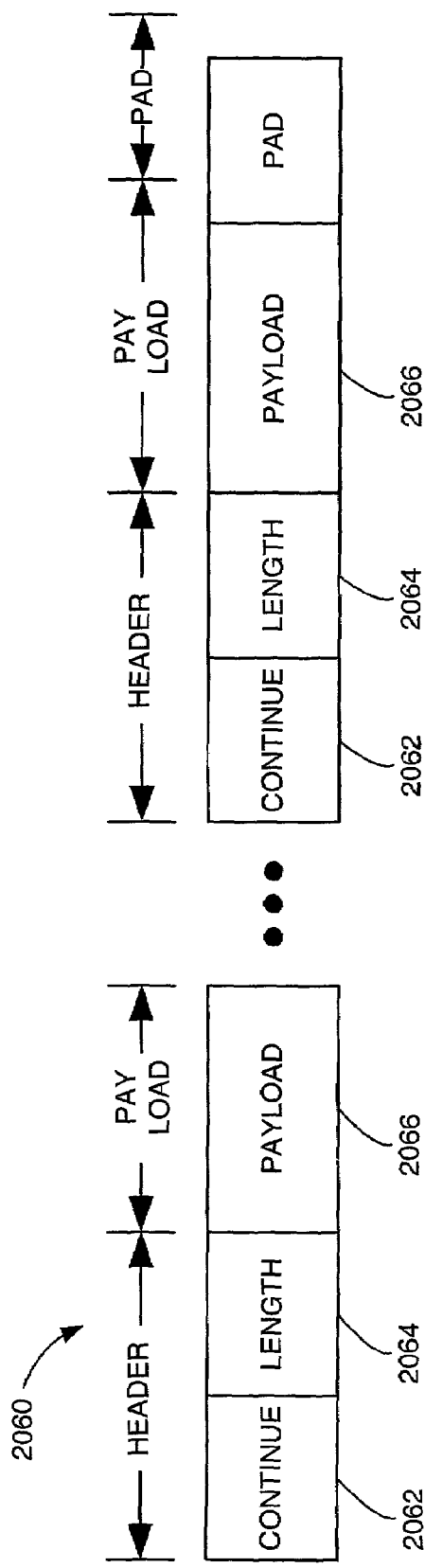

FIG. 17 illustrates the format 2060 of a packing layer packet according to one embodiment. The format 2060 four fields: continue, length, payload, and pad. The continue field 2062 and the length field 2064 make up a header portion. The continue field 2062 is 1-bit field that indicates whether a corresponding payload field 2066 is the start or continuation of an upper layer packet. Alternate embodiments may implement any number of bits having significance with respect to the payload field 2066. In the embodiment illustrated in FIG. 17, when the continue field is set, the corresponding payload field is a continuation of an upper layer packet. Otherwise, the subsequent payload field is the start of an upper layer packet. In this way, each of the pack payloads 2012 (FIG. 15) may include an entire IP layer packet 2002 (or integrity layer payload 2006), a portion of an IP layer packet 2006, multiple IP layer packets 2002. According to an alternate embodiment, the continue field 2062 is not included in the packing layer format 2060, wherein if a previous framing layer packet is discarded before reaching the receiver's framing layer, the receiver may use integrity layer processing to determine the start or continuation status of an integrity layer packet. Such an embodiment, however, places an additional processing burden on the integrity layer and expands the integrity checking processing. Note also, that in one embodiment the continue field 2062 is a single bit, wherein the significance of the bit corresponds to the polarity of the bit. Alternate embodiments may have alternate polarity, or as stated hereinabove, may implement a combination of bits to provide additional information, such as a sequence number, etc.

Continuing with FIG. 17, the header portion further includes a length field 2064. In one embodiment, the length field 2064 is 15-bit field that indicates the number of octets from the first octet in the corresponding payload field 2066 to the last octet in the upper layer packet contained in the subsequent payload field. The payload field 2066 is a variable length field that contains octets from a single integrity layer packet 2006, 2008 (FIG. 15). The number of octets in payload field 2066 is either the length of the octets or the number of octets from the start of the payload field 2006 to the end of the packing layer packet 2016, whichever is less. The pad field 2068 is a variable length field that contains sufficient bits to maintain the size of a packing layer packet 2016 to the size of the lower layer payload supported by the physical layer. The constitution of the pad field 2068 reflects a predetermined recognizable pattern, such as all zero octets, etc. The transmitter fills the pad field 2068, which is received and ignored or discarded by the receiver.

Access Network

Figure 13:
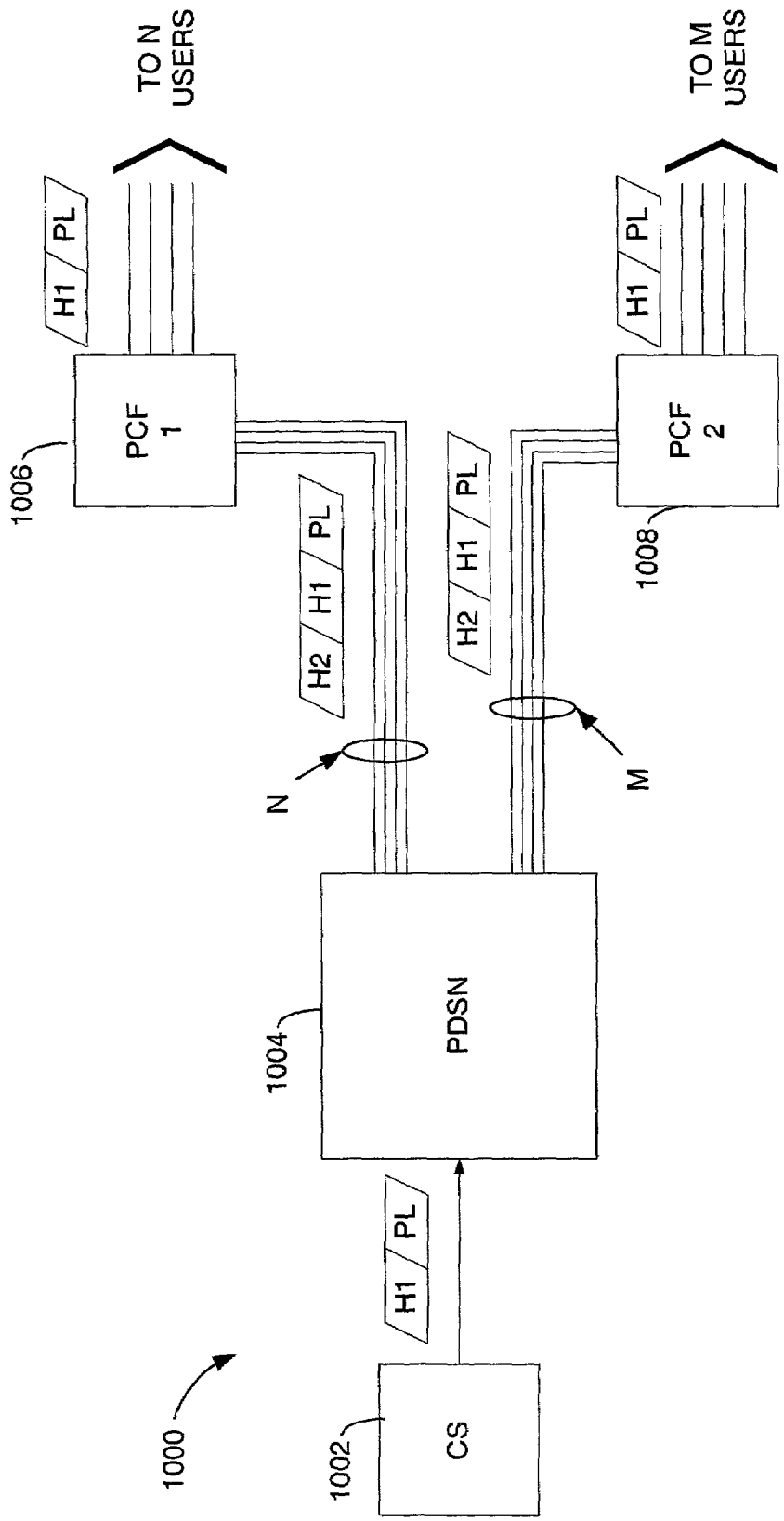
FIGS. 13 and 14 are access networks supporting broadcast transmissions.

A general access network topology for a system 1000 is illustrated in FIG. 13 having a CS 1002, a PDSN 1004, and two PCF: PCF1 1006 and PCF2 1008. FIG. 13 includes datagrams specifying the transmissions from each of the infrastructure elements illustrated in the system 1000. As illustrated, the CS 1002 prepares an IP packet of information and transmits the packet in at least one frame, having a payload and inner header, H1. The inner header has source and destination information, wherein the source identifies the CS 1002 and the destination identifies a subscription group. The CS 1002 transmits the frame to the PDSN 1004, which maps the destination subscription group to individual subscribers in a set of active users.

The PDSN 1004 determines the number of individual users in the active set that are in the destination subscription group and duplicates the frame received from the CS 1002 for each of those users. The PDSN 1004 determines the PCF(s) corresponding to each of the users in the subscription group. The PDSN 1004 then appends an outer header, H2, to each of the prepared frames, wherein H2 identifies a PCF. The PDSN 1004 then transmits the frames to the PCF(s). The transmission from the PDSN 1004 includes the original payload, the header H1, and the Header H2. As illustrated, the PDSN 1004 sends N transmission frames to PCF1 1006 and sends M transmission frames to PCF2 1008. The N transmission frames correspond to N users in the subscription group serviced via PCF1 1006 and the M transmission frames correspond to M users in the subscription group serviced via PCF2 1008. In this scenario, the PDSN 1004 duplicates received frames any number of times for transmission to the corresponding subscribers.

Figure 14:
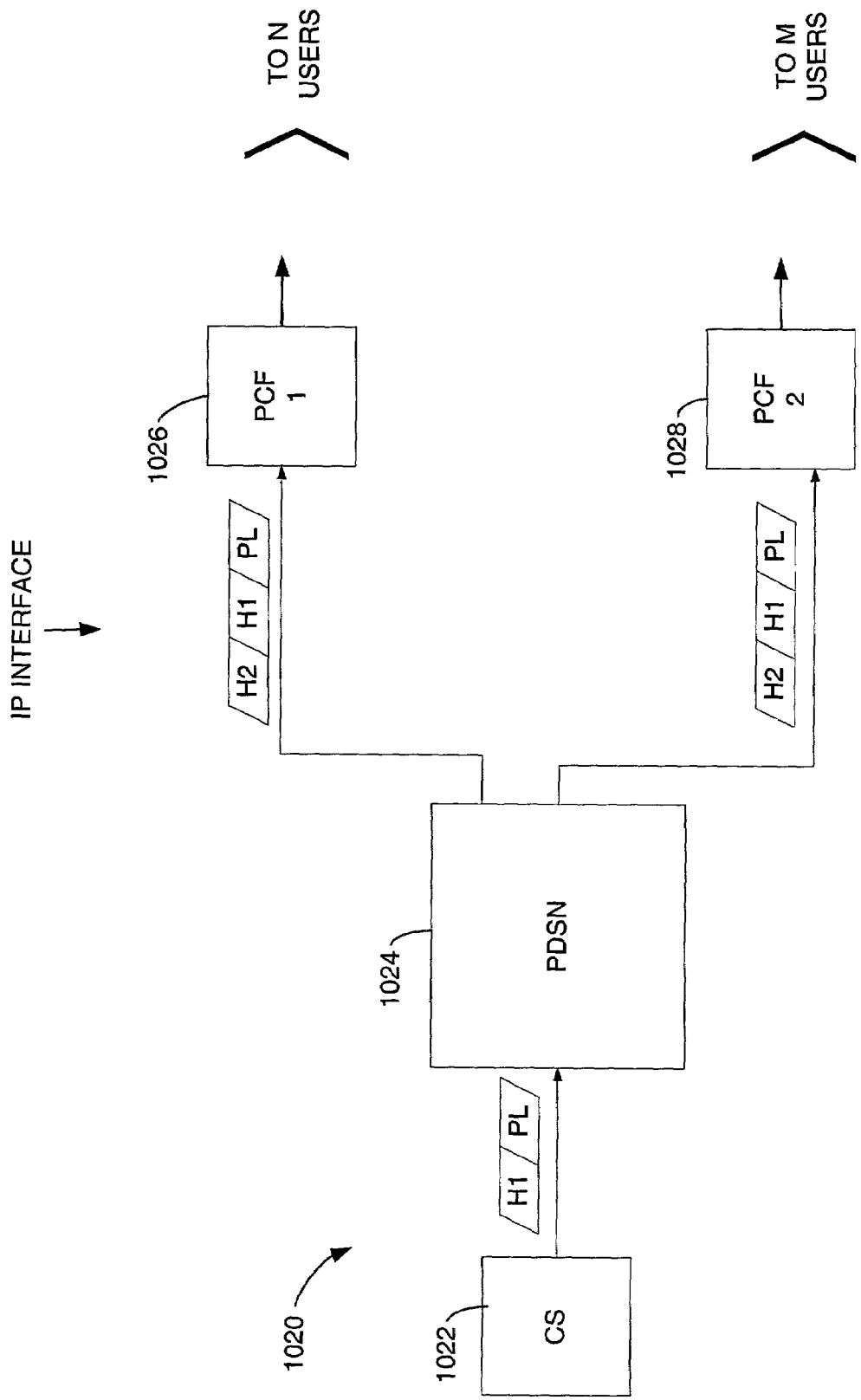

FIG. 14 illustrates an exemplary embodiment of a system 1020 having a CS 1022 communicating with PCF1 1026 and PCF2 1028 via PDSN 1024. As illustrated, the CS 1022 prepares an IP packet of information and transmits the packet in at least one frame, having a payload and inner header, H1. The inner header has source and destination information, wherein the source identifies the CS 1022 and the destination identifies a subscription group. The CS 1022 transmits the frame to the PDSN 1024, wherein the PDSN 1024 appends an outer header, H2, wherein H2 routes the frame to at least one PCF. The PDSN 1024 then transmits the frames to the PCF(s). The transmission from the PDSN 1024 includes the original payload, the header H1, and the Header H2. As illustrated, the PDSN 1024 sends one transmission frame to PCF1 1026 and sends one transmission frame to PCF2 1028. The PCF1 1026 sends one transmission frame to the N users in the subscription group. The PCF2 1028 sends one transmission frame to the M users in the subscription group.

According to an exemplary embodiment, the broadcast CS sends IP packets containing encrypted broadcast content to a multicast group identified by a class-D multicast IP address. This address is used in the destination address field of the IP packets. A given PDSN 1024 participates in multicast routing of these packets. After header compression, the PDSN 1024 places each packet in an HDLC frame for transmission. The HDLC frame is encapsulated by a Generic Routing Encapsulation (GRE) packet. The key field of the GRE packet header uses a special value to indicate a broadcast bearer connection. The GRE packet is appended with the 20-byte IP packet header having a source address field identifying the IP address of the PDSN 1024, and destination address field uses a class-D multicast IP address. It is recommended that this multicast IP address is different from the one used by the broadcast CS. The system 1020 configures at least one multicast routing table of the respective PCFs and PDSNs. The packets delivered in the broadcast connection are provided in sequence; in the exemplary embodiment the GRE sequencing feature is enabled. Duplication of the IP multicast packets is done in multicast-capable routers.

In an exemplary embodiment, each PCF is further coupled to a BSC (not shown), wherein a given BSC may duplicate the packets and send them to another BSC. The chaining of BSCs yields better soft handoff performance. The anchoring BSC yields better soft handoff performance. The anchoring BSC duplicates the transmission frame and sends it with the same time-stamp to its adjacent BSCs. The time-stamp information is critical to the soft handoff operation as the mobile station receives transmission frames from different BSCs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for framing packets in a wireless transmission system supporting broadcast transmissions, the method comprising:
   generating a portion of an Internet Protocol (IP) packet for transmission;
   appending a start of frame indicator to the portion of the IP packet;
   applying an error checking mechanism to the portion of the IP packet not including a protocol field to identify a payload type;
   preparing a frame for transmission, having the start of frame indicator, the portion of the IP packet, and the error checking mechanism; and
   transmitting the frame without the protocol field.

2. The method as in claim 1, wherein the start of frame indicator is a predetermined sequence of bits, the method further comprising:
   if the portion of the IP packet contains the predetermined sequence of bits, inserting a classifier into the portion of the IP packet.

3. The method as in claim 2, wherein the classifier corresponds to an escape character.

4. The method as in claim 1, wherein the error checking mechanism is a frame check sequence.

5. A method for receiving framed packets in a wireless transmission system supporting broadcast transmissions, the method comprising:
   receiving a frame of a packet transmission wherein the frame contains a payload portion of an Internet Protocol (IP) packet and does not include a protocol field to identify a payload type, the frame having a start of frame portion, a payload portion, and an error check portion, the frame not including the protocol field;
   identifying the frame as a start frame in the packet transmission;
   verifying the frame using the error check portion of the frame; and
   processing the payload portion of the frame.

6. The method as in claim 5, wherein if the start of frame indicator is a predetermined sequence of bits, and wherein if the payload portion contains the predetermined sequence of bits, the payload portion further includes a classifier to identify the predetermined sequence of bits in the payload.

7. The method as in claim 6, wherein the classifier defines an escape character.

8. The method as in claim 6, further comprising:
   identifying the classifier in the payload not including protocol information to identify a payload type; and
   processing the payload without the classifier.

9. The method as in claim 5, wherein the error check portion is a frame check sequence.

10. An apparatus for framing packets in a wireless transmission system supporting broadcast transmissions, the apparatus comprising:
- means for generating a portion of an Internet Protocol (IP) packet for transmission;
- means for appending a start of frame indicator to the portion of the IP packet;
- means for applying an error checking mechanism to the portion of the IP packet;
- means for preparing a frame for transmission, having the start of frame indicator, the portion of the IP packet and the error checking mechanism and not including a protocol field to identify a payload type; and
- means for transmitting the frame without the protocol field.

11. An apparatus for receiving framed packets in a wireless transmission system supporting broadcast transmissions, the apparatus comprising:
- means for receiving a frame of a packet transmission wherein the frame contains a payload portion of an Internet Protocol (IP) packet and does not include a protocol field to identify a payload type, the frame having a start of frame portion, a payload portion, and an error check portion, the frame not including the protocol field;
- means for identifying the frame as a start frame in the packet transmission;
- means for verifying the frame using the error check portion of the frame; and
- means for processing the payload portion of the frame.

12. A non-transitory storage medium encoded with executable instructions for framing packets in a wireless transmission system supporting broadcast transmissions, the instructions comprising:
- a first set of instructions for generating a portion of an Internet Protocol (IP) packet for transmission;
- a second set of instructions for appending a start of frame indicator to the portion of the IP packet;
- a third set of instructions for applying an error checking mechanism to the portion of the IP packet;
- a fourth set of instructions for preparing a frame for transmission, having the start of frame indicator, the portion of the IP packet and the error checking mechanism and not including a protocol field to identify a payload type; and
- a fifth set of instructions for transmitting the frame without the protocol field.

13. A non-transitory storage medium encoded with executable instructions for receiving framed packets in a wireless transmission system supporting broadcast transmissions, the instructions comprising:
- a first set of instructions for receiving a frame of a packet transmission wherein the frame contains a payload portion of an Internet Protocol (IP) packet and does not include a protocol field to identify a payload type; the frame having a start of frame portion, a payload portion, and an error check portion, the frame not including the protocol field;
- a second set of instructions for identifying the frame as a start frame in the packet transmission;
- a third set of instructions for verifying the frame using the error check portion of the frame; and
- a fourth set of instructions for processing the payload portion of the frame.

14. An apparatus comprising:
- a memory; and
- a processor for executing a set of instructions stored in the memory, the set of instructions for:
  - generating a portion of an Internet Protocol (IP) packet for transmission;
  - appending a start of frame indicator to the portion of the IP packet;
  - applying an error checking mechanism to the portion of the IP packet not including a protocol field to identify a payload type;
  - preparing a frame for transmission, having the start of frame indicator, the portion of the IP packet, and the error checking mechanism; and
  - transmitting the frame without the protocol field.

15. The apparatus of claim 14, wherein the start of frame indicator is a predetermined sequence of bits and wherein the processor is futher for executing instructions for:
- if the portion of the IP packet contains the predetermined sequence of bits, inserting a classifier into the portion of the IP packet.

16. The apparatus of claim 15, wherein the classifier corresponds to an escape character.

17. The apparatus of claim 14, wherein the error checking mechanism is a frame check sequence.

18. An apparatus for receiving framed packets in a wireless transmission system supporting broadcast transmissions, the apparatus comprising:
- a memory; and
- a processor for executing a set of instructions stored in the memory, the set of instructions for:
  - receiving a frame of a packet transmission wherein the frame contains a payload portion of an Internet Protocol (IP) packet and does not include a protocol field to identify a payload type, the frame having a start of frame portion, a payload portion, and an error check portion, the frame not including the protocol field;
  - identifying the frame as a start frame in the packet transmission;
  - verifying the frame using the error check portion of the frame; and
  - processing the payload portion of the frame.

19. The apparatus of claim 18, wherein if the start of frame indicator is a predetermined sequence of bits, and wherein if the payload portion contains the predetermined sequence of bits, the payload portion further includes a classifier to identify the predetermined sequence of bits in the payload.

20. The apparatus of claim 19, wherein the classifier defines an escape character.

21. The apparatus of claim 19, wherein the processor is further for executing instructions for:
- identifying the classifier in the payload not including protocol information to identify a payload type; and
- processing the payload without the classifier.

22. The apparatus of claim 18, wherein the error check portion is a frame check sequence.

* * * * *